US012803121B2

(12) United States Patent
Kuratani et al.

(10) Patent No.: US 12,803,121 B2
(45) Date of Patent: Nov. 17, 2026

(54) SEPARATOR FOR NON-AQUEOUS SECONDARY BATTERY AND NON-AQUEOUS SECONDARY BATTERY

(71) Applicant: Teijin Limited, Osaka (JP)

(72) Inventors: Rika Kuratani, Osaka (JP); Mai Miura, Osaka (JP); Satoshi Nishikawa, Osaka (JP)

(73) Assignee: TEIJIN LIMITED, Osaka (JP)

(*) Notice: Subject to any disclaimer, the term of this patent is extended or adjusted under 35 U.S.C. 154(b) by 467 days.

(21) Appl. No.: 18/578,816

(22) PCT Filed: Jul. 15, 2022

(86) PCT No.: PCT/JP2022/027945
§ 371 (c)(1),
(2) Date: Jan. 12, 2024

(87) PCT Pub. No.: WO2023/286874
PCT Pub. Date: Jan. 19, 2023

(65) Prior Publication Data

US 2024/0322377 A1 Sep. 26, 2024

(30) Foreign Application Priority Data

Jul. 16, 2021 (JP) ................................ 2021-118147

(51) Int. Cl.

| | |
|---|---|
| ***H01M 50/491*** | (2021.01) |
| ***H01M 10/0525*** | (2010.01) |
| ***H01M 50/426*** | (2021.01) |
| ***H01M 50/446*** | (2021.01) |
| ***H01M 50/457*** | (2021.01) |
| ***H01M 50/46*** | (2021.01) |

(52) U.S. Cl.
CPC ..... *H01M 50/491* (2021.01); *H01M 10/0525* (2013.01); *H01M 50/426* (2021.01); *H01M 50/446* (2021.01); *H01M 50/457* (2021.01); *H01M 50/461* (2021.01)

(58) Field of Classification Search
None
See application file for complete search history.

(56) References Cited

U.S. PATENT DOCUMENTS

| | | | |
|---|---|---|---|
| 8,815,435 | B2 | 8/2014 | Nishikawa |
| 9,461,288 | B2 | 10/2016 | Azais et al. |
| 2002/0110731 | A1 | 8/2002 | Coustier et al. |
| 2012/0015228 | A1 | 1/2012 | Yoon et al. |
| 2014/0242444 | A1 | 8/2014 | Nishikawa et al. |
| 2014/0255754 | A1 | 9/2014 | Nishikawa et al. |
| 2014/0308567 | A1 | 10/2014 | Nishikawa et al. |
| 2014/0315068 | A1 | 10/2014 | Nishikawa et al. |
| 2016/0285063 | A1 | 9/2016 | Yang et al. |
| 2016/0365556 | A1 | 12/2016 | Liu et al. |
| 2017/0338460 | A1 | 11/2017 | Kim et al. |
| 2020/0052301 | A1 | 2/2020 | Asai et al. |
| 2022/0006091 | A1 | 1/2022 | Asai et al. |
| 2022/0158301 | A1 | 5/2022 | Sato |

FOREIGN PATENT DOCUMENTS

| | | | |
|---|---|---|---|
| EP | 3 627 586 | A1 | 3/2020 |
| EP | 3683860 | A1 | 7/2020 |
| JP | 2017-208338 | A | 11/2017 |
| JP | 6487130 | B1 | 3/2019 |
| JP | 2020-155208 | A | 9/2020 |
| KR | 10-2010-0113030 | A | 10/2010 |
| WO | 2013/058367 | A1 | 4/2013 |
| WO | 2013/058368 | A1 | 4/2013 |
| WO | 2013/058369 | A1 | 4/2013 |
| WO | 2013/058370 | A1 | 4/2013 |
| WO | 2018/163969 | A1 | 9/2018 |
| WO | 2018/212252 | A1 | 11/2018 |

OTHER PUBLICATIONS

Machine Translation of WO 2018 212252 (Year: 2018).*
International Search Report for PCT/JP2022/027945 dated Aug. 23, 2022.
Ethan Rao et al., "Roll-to-Roll Functionalization of Polyolefin Separators for High-Performance Lithium-Ion Batteries", ACS Applied Energy Materials, Jun. 20, 2018, vol. 1, No. 7, pp. 3292-3300.
Meringolo Carmen et al: "Exploiting Fluoropolymers Immiscibility to Tune Surface Properties and Mass Transfer in Blend Membranes for Membrane Contactor Applications", ACS Applied Polymer Materials, vol. 1, No. 3, Feb. 25, 2019 (Feb. 25, 2019), pp. 326-334.

* cited by examiner

*Primary Examiner* — Wyatt P Mcconnell
(74) *Attorney, Agent, or Firm* — Sughrue Mion, PLLC

(57) ABSTRACT

Provided is a separator for a non-aqueous secondary battery, the separator contains a porous substrate and an adhesive porous layer that is provided on one side or on both sides of the porous substrate, and that contains a polyvinylidene fluoride type resin and a filler, in which the porous substrate contains a fluorine atom, and when differential scanning calorimetry is performed with all of the polyvinylidene fluoride type resin contained in the adhesive porous layer as a sample, two or more endothermic peaks and/or two or more exothermic peaks are observed.

20 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2022/027945 filed Jul. 15, 2022, claiming priority based on Japanese Patent Application No. 2021-118147 filed Jul. 16, 2021.

TECHNICAL FIELD

The disclosure relates to a separator for a non-aqueous secondary battery and a non-aqueous secondary battery.

BACKGROUND ART

WO 2013/058367 A, WO 2013/058368 A, WO 2013/058369 A, and WO 2013/058370 A each disclose a separator for a non-aqueous secondary battery, the separator including a porous substrate and an adhesive porous layer containing a polyvinylidene fluoride type resin, in which the polyvinylidene fluoride type resin contains at least two types of polyvinylidene fluoride type resins.

JP 6487130 B discloses a separator for a non-aqueous secondary battery, the separator including a porous substrate and an adhesive porous layer containing a polyvinylidene fluoride type resin, in which the polyvinylidene fluoride type resin contains a copolymer of vinylidene fluoride, hexafluoropropylene, and a monomer having an acidic group or an ester group.

SUMMARY OF INVENTION

Technical Problem

A battery using a separator having an adhesive porous layer containing a polyvinylidene fluoride type resin is generally manufactured by manufacturing a laminate of an electrode and a separator, housing the laminate in an exterior material, injecting an electrolytic solution thereinto, and performing a hot pressing treatment (referred to as "wet heat press" in the present disclosure). According to wet heat press, since the polyvinylidene fluoride type resin is hot-pressed in a state of being swollen in the electrolytic solution, adhesion between the electrode and the separator is good, and favorable battery characteristics are easily obtained. Note that, when wet heat press is performed at a relatively high temperature, the electrolytic solution or an electrolyte may be decomposed to generate gas in the battery, which causes, for example, deterioration of cycle characteristics and dimensional stability of the battery.

Meanwhile, there is a technique in which a laminate of an electrode and a separator is subjected to a hot pressing treatment (referred to as "dry heat press" in the present disclosure) without being impregnated with an electrolytic solution to bond the electrode and the separator to each other. If the electrode and the separator are sufficiently bonded to each other by dry heat press, wet heat press is not required, and therefore decomposition of an electrolytic solution and an electrolyte does not occur.

In addition, even in a case where wet heat press is performed, when dry heat press is performed on the laminate prior to wet heat press to bond the electrode and the separator to each other, the temperature of wet heat press can be set to a relatively low temperature, and therefore decomposition of the electrolytic solution and the electrolyte can be suppressed. In addition, when the separator is bonded to an electrode by dry heat press before the laminate is housed in an exterior material, deformation of the laminate that may occur during conveyance for housing the laminate in the exterior material is suppressed.

Therefore, if the separator can be favorably bonded to an electrode by dry heat press, it is expected that performance of the battery having a larger area can be maintained.

By the way, it is known that when a non-aqueous secondary battery is charged and discharged at a high speed, the temperature inside the battery may become high, and in the non-aqueous secondary battery exposed to the high temperature, a porous structure of a separator changes, and battery performance (for example, a capacity retention ratio) is deteriorated.

In addition, it is known that when the temperature inside the battery becomes high, it is difficult to hold the electrolytic solution particularly in the porous substrate, and ion permeability of the separator decreases to increase a film resistance value.

The present disclosure has been made under the above circumstances.

An object of the present disclosure is to provide a separator for a non-aqueous secondary battery, the separator being excellent in adhesion to an electrode by dry heat press and adhesion to the electrode by wet heat press, having a low film resistance value even after exposure to a high temperature because of an easy holding feature of an electrolytic solution in a porous substrate, and having a high capacity retention ratio of a battery even after exposure to a high temperature.

Solution to Problem

The specific solutions to the problem include the following embodiments:

<1> A separator for a non-aqueous secondary battery, the separator containing:
- a porous substrate; and
- an adhesive porous layer that is provided on one side or on both sides of the porous substrate, and that contains a polyvinylidene fluoride type resin and a filler,
- wherein the porous substrate contains a fluorine atom, and
- wherein, when differential scanning calorimetry is performed with all of the polyvinylidene fluoride type resin contained in the adhesive porous layer as a sample, two or more endothermic peaks and/or two or more exothermic peaks are observed.

<2> The separator for a non-aqueous secondary battery according to <1>, wherein, when differential scanning calorimetry is performed with all of the polyvinylidene fluoride type resin contained in the adhesive porous layer as a sample, at least one endothermic peak is observed in a region of 125° C. or more and less than 140° C. and at least one endothermic peak is observed in a region of 140° C. or more and less than 190° C.

<3> The separator for a non-aqueous secondary battery according to <1> or <2>, wherein, when differential scanning calorimetry is performed with all of the polyvinylidene fluoride type resin contained in the adhesive porous layer as a sample, two or more endothermic peaks are observed, and a temperature difference between adjacent endothermic peaks is 10° C. or more and 60° C. or less.

<4> The separator for a non-aqueous secondary battery according to any one of <1> to <3>, wherein, when differential scanning calorimetry is performed with all of the polyvinylidene fluoride type resin contained in the adhesive porous layer as a sample, at least one exothermic peak is observed in a region of 80° C. or more and less than 125° C., and at least one exothermic peak is observed in a region of 125° C. or more and less than 190° C.

<5> The separator for a non-aqueous secondary battery according to any one of <1> to <4>, wherein, when differential scanning calorimetry is performed with all of the polyvinylidene fluoride type resin contained in the adhesive porous layer as a sample, two or more exothermic peaks are observed, and a temperature difference between adjacent exothermic peaks is 10° C. or more and 90° C. or less.

<6> A separator for a non-aqueous secondary battery, the separator containing:

a porous substrate; and an adhesive porous layer that is provided on one side or on both sides of the porous substrate, and that contains a polyvinylidene fluoride type resin and a filler, wherein the porous substrate contains a fluorine atom, and wherein the polyvinylidene fluoride type resin contains the following polyvinylidene fluoride type resin X and the following polyvinylidene fluoride type resin Y:

polyvinylidene fluoride type resin X: containing structural units derived from vinylidene fluoride and structural units derived from hexafluoropropylene, a content ratio of structural units derived from hexafluoropropylene being from more than 3.5 mol % to 15 mol % with respect to a total of structural units, a weight-average molecular weight being from 100,000 to less than 1,000,000, and a melting point being from 125° C. to less than 150° C., and polyvinylidene fluoride type resin Y: containing structural units derived from vinylidene fluoride and optionally containing structural units derived from hexafluoropropylene, a content ratio of structural units derived from hexafluoropropylene being from 0 mol % to 3.5 mol % with respect to a total of structural units, a weight-average molecular weight being from 1,000,000 to less than 3,000,000, and a melting point being from 150° C. to less than 180° C.

<7> The separator for a non-aqueous secondary battery according to <6>, wherein, when differential scanning calorimetry is performed with all of the polyvinylidene fluoride type resin contained in the adhesive porous layer as a sample, two or more endothermic peaks and/or two or more exothermic peaks are observed.

<8> The separator for a non-aqueous secondary battery according to <6> or <7>, wherein a difference between a melting point of the polyvinylidene fluoride type resin X and a melting point of the polyvinylidene fluoride type resin Y is from 25° C. to less than 55° C.

<9> The separator for a non-aqueous secondary battery according to any one of <6> to <8>, wherein a mass ratio of the polyvinylidene fluoride resin X and the polyvinylidene fluoride resin Y in the adhesive porous layer is from 20:80 to 80:20.

<10> The separator for a non-aqueous secondary battery according to any one of <6> to <9>, wherein the polyvinylidene fluoride type resin X contains structural units derived from vinylidene fluoride and structural units derived from hexafluoropropylene, a content ratio of structural units derived from hexafluoropropylene is from more than 5.0 mol % to 15 mol % with respect to a total of structural units, the weight-average molecular weight of the polyvinylidene fluoride type resin X is from 300,000 to less than 1,000,000, and the melting point of the polyvinylidene fluoride type resin X is from 125° C. to less than 140° C.

<11> The separator for a non-aqueous secondary battery according to any one of <6> to <10>, wherein the polyvinylidene fluoride type resin Y contains structural units derived from vinylidene fluoride and optionally contains structural units derived from hexafluoropropylene, a content ratio of structural units derived from hexafluoropropylene is from 0 mol % to 2.0 mol % with respect to a total of structural units, the weight-average molecular weight of the polyvinylidene fluoride type resin Y is from 1,500,000 to less than 2,000,000, and the melting point of the polyvinylidene fluoride type resin Y is from 150° C. to less than 170° C.

<12> The separator for a non-aqueous secondary battery according to any one of <1> to <11>, wherein a content ratio of fluorine atom in the porous substrate is from 0.05 atomic % to 1.00 atomic %.

<13> The separator for a non-aqueous secondary battery according to any one of <1> to <12>, wherein the adhesive porous layer contains structural units derived from a monomer represented by the following formula (1):

Formula (1)

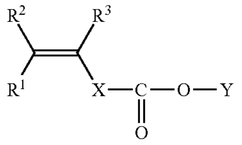

wherein, in Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or $-R-O-C(=O)-(CH_2)_n-C(=O)-OH$, wherein R represents a $C_{1-5}$ alkylene group and n represents an integer of 0 or more.

<14> The separator for a non-aqueous secondary battery according to any one of <1> to <13>, wherein an acid value of all of the polyvinylidene fluoride type resin contained in the adhesive porous layer is less than 3.0 mg KOH/g.

<15> The separator for a non-aqueous secondary battery according to any one of <1> to <14>, wherein a weight-average molecular weight of all of the polyvinylidene fluoride type resin contained in the adhesive porous layer is from 300,000 to less than 3,000,000.

<16> The separator for a non-aqueous secondary battery according to any one of <1> to <15>, wherein a content ratio of structural units derived from hexafluoropropylene is from more than 3.5 mol % to 7.0 mol % with respect to a total of structural units, in all of the polyvinylidene fluoride type resin contained in the adhesive porous layer.

<17> The separator for a non-aqueous secondary battery according to any one of <1> to <16>, wherein a volume ratio of the filler in the adhesive porous layer excluding pores is from 30% by volume to 90% by volume.

<18> The separator for a non-aqueous secondary battery according to any one of <1> to <17>, wherein the filler contains at least one selected from the group consisting of metal hydroxide particles, metal sulfate particles, and barium titanate particles.

<19> The separator for a non-aqueous secondary battery according to any one of <1> to <18>, wherein an average primary particle size of all of the filler contained in the adhesive porous layer is from 0.01 μm to 1.5 μm.

<20> A non-aqueous secondary battery that obtains electromotive force by lithium doping and dedoping, the non-aqueous secondary battery comprising:

a positive electrode;

a negative electrode; and the separator for a non-aqueous secondary battery according to any one of <1> to <19>, the separator being disposed between the positive electrode and the negative electrode.

Advantageous Effects of Invention

The present disclosure provides a separator for a non-aqueous secondary battery, the separator being excellent in adhesion to an electrode by dry heat press and adhesion to the electrode by wet heat press, having a low film resistance value even after exposure to a high temperature because of an easy holding feature of an electrolytic solution in a porous substrate, and having a high capacity retention ratio of a battery even after exposure to a high temperature.

DESCRIPTION OF EMBODIMENTS

Hereinafter, the embodiments will be described. Further, the description and the Examples thereof illustrate the embodiments, but do not limit the scope of the embodiments.

In the disclosure, the numerical range denoted by using "to" represents the range inclusive of the number written before and after "to" as the minimum and maximum values.

Regarding stepwise numerical ranges designated in the disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the disclosure, the term "process" includes not only an independent process, but also the process which is not clearly distinguished from other processes but achieves the desired purpose thereof.

In the disclosure, when the amount of each component in a composition is referred to and when a plurality of substances corresponding to each component are present in the composition, the total amount of the plurality of components present in the composition is meant unless otherwise specified.

A plurality of kinds of particles corresponding to each component in the disclosure may be contained. When there are a plurality of kinds of particles corresponding to each component in a composition, a particle diameter of each component means a value for a mixture of the plurality of kinds of particles present in the composition unless otherwise specified.

In the disclosure, "MD (machine direction)" refers to the longitudinal direction of a porous substrate and a separator manufactured in a long shape, and "TD (transverse direction)" refers to a direction orthogonal to "MD direction" in a surface direction of the porous substrate and a separator. In the disclosure, "TD" also refers to a width direction.

In the disclosure, in a case where a lamination relationship among layers constituting a separator is expressed as "upper" and "lower", a layer closer to a porous substrate is referred to as "lower", and a layer farther from the porous substrate is referred to as "upper".

In the disclosure, performing the hot pressing treatment by impregnating the separator with the electrolytic solution is referred to as "wet heat press", and performing the hot pressing treatment without impregnating the separator with the electrolytic solution is referred to as "dry heat press".

In the present disclosure, a "structural unit" of a copolymer or a resin has the same meaning as a monomer unit.

In the present disclosure, the volume of an adhesive porous layer excluding pores is referred to as a "solid content volume".

<Separator for Non-Aqueous Secondary Battery>

A separator for a non-aqueous secondary battery (also referred to as "separator") of the disclosure includes a porous substrate and an adhesive porous layer provided on one side or on both sides of the porous substrate. The adhesive porous layer of the separator according to the disclosure contains a polyvinylidene fluoride type resin and a filler Description of an adhesive porous layer in the present disclosure is description of an adhesive porous layer on each side of a porous substrate. A separator of the present disclosure only needs to have the adhesive porous layer of the present disclosure on at least one side of the porous substrate. Examples of an embodiment of the separator of the present disclosure include the following form examples (1) to (3).

(1) A separator having the adhesive porous layers of the present disclosure on both sides of a porous substrate. In the separator, an adhesive porous layer on one side and an adhesive porous layer on the other side may be the same or different in components, composition, thermal properties, and the like.

(2) A separator having the adhesive porous layer of the present disclosure on one side of a porous substrate and having another layer on the other side of the porous substrate.

(3) A separator having the adhesive porous layer of the present disclosure on one side of a porous substrate and having no layer on the other side of the porous substrate (that is, the side of the porous substrate is exposed).

The porous substrate in the separator of the present disclosure contains a fluorine atom. The porous substrate containing a fluorine atom easily holds an electrolytic solution inside the porous substrate, and a film resistance value is less likely to increase even when the temperature inside the battery becomes high.

A content ratio of fluorine atom to all the atoms contained in the porous substrate is preferably 0.05 atomic % or more, more preferably 0.06 atomic % or more, and still more preferably 0.07 atomic % or more from a viewpoint of holding the electrolytic solution inside the porous substrate to suppress an increase in the film resistance value.

The content ratio of fluorine atom to all the atoms contained in the porous substrate is preferably 1.00 atomic % or less, more preferably 0.50 atomic % or less, and still more preferably 0.35 atomic % or less from a viewpoint of ion permeability.

A fact that the porous substrate contains a fluorine atom and the content ratio of fluorine atoms to all the atoms contained in the porous substrate are determined by performing elemental analysis using scanning electron microscope-energy dispersive X-ray spectroscopy (SEM-EDX).

A cross section of the separator is prepared by a Cryo BIB method, and platinum coating is performed by an ion sputtering method to perform conductive treatment. In a central portion in a thickness direction of the porous substrate in a region of the porous substrate in the separator cross section, elemental analysis is performed on a region of 6 μm in the thickness direction×12 μm in a plane direction.

The porous substrate containing a fluorine atom is obtained, for example, by coating a pore surface of the porous substrate with a part of a coating liquid for forming the adhesive porous layer (The coating liquid contains a polyvinylidene fluoride type resin) when the coating liquid is applied to the porous substrate, and attaching the polyvinylidene fluoride type resin to the porous substrate.

The content ratio of fluorine atom to all the atoms contained in the porous substrate is controlled by, for example, impregnating the porous substrate with a good solvent for a polyvinylidene fluoride type resin in advance, and adjusting the permeation amount of the coating liquid into the porous substrate; adjusting a viscosity of the coating liquid by the molecular weight of the polyvinylidene fluoride type resin to adjust the permeation amount of the coating liquid into the porous substrate; and adjusting a concentration of the polyvinylidene fluoride type resin in the coating liquid to adjust the amount of the polyvinylidene fluoride type resin attached to a pore surface of the porous substrate.

As another method for controlling the content ratio of fluorine atom to all the atoms contained in the porous substrate, there is also a method for impregnating the porous substrate with a solution in which a fluorine atom-containing compound is dissolved in a good solvent in advance to cause the fluorine atom-containing compound to be carried inside the porous substrate before the polyvinylidene fluoride type resin is applied. In this method, the content ratio of fluorine atom to all the atoms contained in the porous substrate can be controlled by selecting a compound in consideration of solubility in a solvent such that the fluorine atom content in the fluorine atom-containing compound is appropriate; adjusting a concentration of the fluorine atom-containing compound in a solution in which the fluorine atom-containing compound is dissolved in a good solvent; and adjusting an impregnation amount of the solution in which the fluorine atom-containing compound is dissolved in the good solvent into the porous substrate.

As the fluorine atom-containing compound, a low molecular fluorine atom-containing compound, a fluorine atom-containing polymer compound, or the like can be selected. A polyolefin containing a fluorine atom is preferable, a polyvinylidene fluoride type resin is more preferable, and a polyvinylidene fluoride type resin having the same chemical composition as that of the polyvinylidene fluoride type resin forming the adhesive porous layer is still more preferable. The good solvent for dissolving the fluorine atom-containing compound is not particularly limited as long as it is a solvent capable of uniformly dissolving the fluorine atom-containing compound, and examples thereof include polar amide solvents such as N-methylpyrrolidone, dimethylacetamide, and dimethylformamide. It is preferable to use the same kind of solvent as the coating liquid for forming the adhesive porous layer.

In the separator of the present disclosure, when differential scanning calorimetry (DSC) is performed with all of the polyvinylidene fluoride type resin contained in the adhesive porous layer as a sample, two or more endothermic peaks and/or two or more exothermic peaks are observed.

Two or more endothermic peaks and/or two or more exothermic peaks only need to be observed, and both two or more endothermic peaks and two or more exothermic peaks may be observed. When two or more endothermic peaks are observed, the number of endothermic peaks may be two or three or more. When two or more exothermic peaks are observed, the number of exothermic peaks may be two or three or more.

When DSC is performed with all of the polyvinylidene fluoride type resin contained in the adhesive porous layer as a sample, a fact that two or more endothermic peaks or two or more exothermic peaks are observed in a DSC curve with a heat flow as a vertical axis and time or temperature as a horizontal axis means that a polyvinylidene fluoride type resin in which a polymer chain moves by heating at a relatively low temperature (in other words, a polyvinylidene fluoride type resin in which a polymer chain easily moves) and a polyvinylidene fluoride type resin in which a polymer chain moves by heating at a relatively high temperature (in other words, a polyvinylidene fluoride type resin in which a polymer chain hardly moves) are contained in the adhesive porous layer.

By inclusion of the polyvinylidene fluoride type resin in which a polymer chain easily moves in the adhesive porous layer, the adhesive porous layer exhibits adhesion even when hot pressing in a state where the polyvinylidene fluoride type resin is not swollen in an electrolytic solution or hot pressing at a relatively low temperature is performed. It is presumed that by inclusion of the polyvinylidene fluoride type resin in which a polymer chain hardly moves in the adhesive porous layer, blocking of the adhesive porous layer is suppressed and performance of the separator is maintained even when hot pressing in a state where the polyvinylidene fluoride type resin is swollen in an electrolytic solution or hot pressing at a relatively high temperature is performed.

In addition, it is presumed that by inclusion of the polyvinylidene fluoride type resin in which a polymer chain hardly moves in the adhesive porous layer, blocking of the adhesive porous layer is suppressed even when the temperature inside the battery becomes high.

Therefore, it is presumed that the separator of the present disclosure is excellent in adhesion to an electrode by either dry heat press or wet heat press while maintaining performance of the separator, and has a high capacity retention ratio of the battery even after exposure to a high temperature.

The separator of the present disclosure preferably exhibits at least one of the following (a) to (d) from a viewpoint of achieving both adhesion to an electrode by hot pressing and maintenance of performance of the separator after hot pressing.

(a) When DSC is performed with all of the polyvinylidene fluoride type resin contained in the adhesive porous layer as a sample, two or more endothermic peaks are observed, and at least one endothermic peak is observed in a region of 125° C. or more and less than 140° C. and at least one endothermic peak is observed in a region of 140° C. or more and less than 190° C.

In this case, an endothermic peak may be further observed in a region other than the above two regions.

(b) When DSC is performed with all of the polyvinylidene fluoride type resin contained in the adhesive porous layer as a sample, two or more endothermic peaks are observed, and a temperature difference between adjacent endothermic peaks is 10° C. or more and 60° C. or less.

The temperature difference is preferably 15° C. or more, and more preferably 20° C. or more. The above temperature difference is preferably 50° C. or less, and more preferably 40° C. or less.

(c) When DSC is performed with all of the polyvinylidene fluoride type resin contained in the adhesive porous layer as a sample, two or more exothermic peaks are observed, and at least one exothermic peak is observed in a region of 80° C. or more and less than 125° C. and at least one exothermic peak is observed in a region of 125° C. or more and less than 190° C.

In this case, an exothermic peak may be further observed in a region other than the above two regions.

(d) When DSC is performed with all of the polyvinylidene fluoride type resin contained in the adhesive porous layer as a sample, two or more exothermic peaks are observed, and a temperature difference between adjacent exothermic peaks is 10° C. or more and 90° C. or less.

The temperature difference is preferably 15° C. or more, more preferably 18° C. or more, and still more preferably 20° C. or more. The temperature difference is preferably 80° C. or less, more preferably 50° C. or less, and still more preferably 40° C. or less.

Examples of a method for controlling an endothermic peak and an exothermic peak of DSC related to the polyvinylidene fluoride type resin contained in the adhesive porous layer include the following (I) and (II).

(I) Two or more types of polyvinylidene fluoride type resins different in the type or amount of a polymerization component, a molecular weight, or a melting point are used to form the polyvinylidene fluoride type resin, and a mixing ratio therebetween is adjusted.

(II) Crystallinity of the polyvinylidene fluoride type resin contained in the adhesive porous layer is controlled by heat conditions when the adhesive porous layer is formed, the type or amount of a filler, or blending of a crystal control agent.

DSC performed with all of the polyvinylidene fluoride type resin contained in the adhesive porous layer as a sample, and a method for observing an endothermic peak and an exothermic peak will be described.

—Sample—

The adhesive porous layer is peeled off from the separator, and the peeled adhesive porous layer is immersed in dimethylacetamide and heated to about 50° C. to obtain a resin solution in which the polyvinylidene fluoride type resin is dissolved. The resin solution is centrifuged in a centrifuge to precipitate an insoluble matter. A rotational speed of the centrifuge is set to a speed effective for precipitating the insoluble matter depending on a radius of a rotor. The supernatant of the resin solution in which the insoluble matter has been precipitated is taken out, centrifugation is repeated, and the insoluble matter is removed. The resin solution from which the insoluble matter has been removed is added dropwise to water to solidify the polyvinylidene fluoride type resin. The solidified product is taken out from the water and dried, and the dried solid is used as a sample.

When the separator has the adhesive porous layers (or layers similar to the adhesive porous layer) on both sides, the adhesive porous layer (or a layer similar to the adhesive porous layer) is peeled off from each of the sides, and the adhesive porous layer (or a layer similar to the adhesive porous layer) peeled off from each of the sides is used as a separate sample.

—Differential Scanning Calorimetry (DSC)—

5.0 mg±0.3 mg of the sample is put in an aluminum sample pan and set in a measuring apparatus. In a nitrogen atmosphere, the following three steps are continuously performed to perform thermal analysis of the sample.

Step 1: Temperature is raised from 30° C. to 200° C. at a rate of 5° C./min.

Step 2: Temperature is lowered from 200° C. to 30° C. at a rate of 5° C./min.

Step 3: Temperature is raised from 30° C. to 200° C. at a rate of 5° C./min.

—Observation of Endothermic Peak and Exothermic Peak—

Based on the result of the thermal analysis of DSC, a DSC curve with temperature (° C.) as a horizontal axis and a heat flow (W/g) as a vertical axis is drawn.

In step 2, an upward protruding portion in a temperature range of from 180° C. to 60° C. is defined as an exothermic peak. A temperature at a maximum point of the exothermic peak, that is, a temperature at which a slope of a tangent changes from negative to positive from a high temperature toward a low temperature in the DSC curve in step 2 is defined as an exothermic peak temperature.

In step 3, a downward protruding portion in a temperature range of from 60° C. to 180° C. is defined as an endothermic peak. A temperature at a minimum point of the endothermic peak, that is, a temperature at which a slope of a tangent changes from negative to positive from a low temperature toward a high temperature in the DSC curve in step 3 is defined as an endothermic peak temperature.

Hereinafter, the details of the porous substrate and the adhesive porous layer included in the separator of the present disclosure will be described.

[Porous Substrate]

The porous substrate in the disclosure refers to a substrate having pores or voids therein. As the substrate, a microporous film; a porous sheet such as non-woven fabric and paper, composed of a fibrous material; a composite porous sheet in which on a microporous film or a porous sheet, one or more of another porous layer are laminated; and the like may be listed. In the disclosure, a microporous film is preferable from a viewpoint of thinning and strength of a separator. The microporous film refers to a film having a large number of micropores therein, having a structure in which these micropores are connected to each other, and allowing gas or liquid to pass from one side to the other side.

As the material for the porous substrate, materials having electrical insulation are preferably used and any of organic materials and inorganic materials may be used.

It is preferred that the porous substrate contains a thermoplastic resin, from a viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film" in the disclosure) is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from a viewpoint of exhibiting the shutdown function, and the content of polyethylene is preferably 95% by mass or more with respect to the total mass of the polyolefin microporous film.

It is preferred that the microporous film contains polypropylene, from a viewpoint of imparting heat resistance to the extent that the film is not easily broken when exposed to a high temperature.

It is preferred that the polyolefin microporous film contains polyethylene and polypropylene, from a viewpoint of imparting shutdown function and heat resistance that the film is not easily broken when exposed to a high temperature. As the polyolefin microporous film including polyethylene and polypropylene, a microporous film in which polyethylene and polypropylene are present in a mixed state in a layer may be mentioned. It is preferred that the microporous film contains 95% by mass or more of polyethylene and 5% by mass or less of polypropylene, from a viewpoint of compatibility of the shutdown function and heat resistance. In addition, from a viewpoint of compatibility of the shutdown function and heat resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight average molecular weight (Mw) of from 100,000 to 5,000,000 is preferred. When the polyolefin has a Mw of 100,000 or more, sufficient mechanical properties may be provided to the microporous film. Meanwhile, when the polyolefin has a Mw of 5,000,000 or less, the shutdown characteristic of the microporous film is favorable, and film molding of the microporous film is easy.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; heat-resistant resins such as wholly aromatic polyamide, polyamide-imide, polyimide, polyethersulfone, polysulfone, polyetherketone and polyetherimide; cellulose; and the like, or paper may be mentioned.

In the present disclosure, a heat resistant resin refers to a resin having a melting point of 200° C. or more, or a resin having no melting point and a decomposition temperature of 200° C. or more. That is, the heat resistant resin in the present disclosure is a resin that is not melted or decomposed in a temperature range of less than 200° C.

Examples of the composite porous sheet include a sheet in which a functional layer is stacked on a porous sheet made of a microporous film or a fibrous material. Such a composite porous sheet is preferable from a viewpoint that a function can be further added thereto with a functional layer. Examples of the functional layer include a porous layer made of a heat-resistant resin and a porous layer made of a heat-resistant resin and an inorganic filler from a viewpoint of imparting heat resistance. Examples of the heat-resistant resin include one or more heat-resistant resins selected from the group consisting of a wholly aromatic polyamide, a polyamide imide, a polyimide, a polyethersulfone, a polysulfone, a polyetherketone, and a polyetherimide. Examples of the inorganic filler include a metal oxide such as alumina, and a metal hydroxide such as magnesium hydroxide. Examples of a method of forming a composite include a method of applying a functional layer to a microporous film or a porous sheet, a method of bonding a microporous film or a porous sheet and a functional layer with an adhesive, and a method of thermally press-bonding a microporous film or a porous sheet with a functional layer.

The surface of the porous substrate may be subjected to various surface treatments within the range of not impairing the nature of the porous substrate, for the purpose of improving wettability with the coating liquid for forming the adhesive porous layer. As the surface treatment, corona treatment, plasma treatment, flame treatment, UV irradiation treatment, and the like may be mentioned.

[Characteristics of Porous Substrate]

The thickness of the porous substrate is preferably 25 μm or less, more preferably 20 μm or less, and still more preferably 15 μm or less, from a viewpoint of enhancing energy density of the battery, and is preferably 3 μm or more, more preferably 5 μm or more, still more preferably 8 μm or more, from a viewpoint of production yield of the separator and production yield of the battery.

The Gurley value of the porous substrate (JIS P8117: 2009) is preferably 20 sec/100 ml or more, more preferably 25 sec/100 ml or more, still more preferably 60 sec/100 ml or more, and further still more preferably 65 sec/100 ml or more from a viewpoint of suppression of battery short circuit.

The Gurley value of the porous substrate (JIS P8117: 2009) is preferably 220 sec/100 ml or less, more preferably 200 sec/100 ml or less, still more preferably 190 sec/100 ml or less, and further still more preferably 150 sec/100 ml or less from a viewpoint of ion permeability and suppression of occlusion of porous structure at the boundary between the porous substrate and the adhesive porous layer when exposed to a high temperature.

The porous substrate preferably has a porosity of from 20% to 60% from a viewpoint of obtaining an appropriate film resistance and a shutdown function. The porosity ε (%) of the porous substrate is determined by the following formula.

$$\varepsilon = \{1 - Ws/(ds \cdot t)\} \times 100$$

Here, Ws: basis weight of porous substrate (g/m$^2$), ds: true density of porous substrate (g/cm$^3$), and t: thickness (μm) of porous substrate. Basis weight refers to a mass per unit area.

The porous substrate preferably has an average pore size of from 15 nm to 100 nm from a viewpoint of ion permeability or suppression of battery short circuit. The average pore size of the porous substrate is measured using a palm porometer (CFP-1500-A manufactured by PMI) according to ASTM E1294-89.

[Adhesive Porous Layer]

The adhesive porous layer means a layer that has a large number of micropores inside, in which these micropores are connected to allow gas or liquid to pass therethrough from one side to the other side.

The adhesive porous layer may be provided only on one side of the porous substrate, or the adhesive porous layers may be provided on both sides of the porous substrate. When the adhesive porous layers are provided on both sides of the porous substrate, the separator is less likely to be curled, and has excellent handleability during manufacture of a battery. When the adhesive porous layer is provided only on one side of the porous substrate, the separator has better ion permeability. In addition, the thickness of the entire separator can be suppressed, and a battery having a higher energy density can be manufactured.

The adhesive porous layer contains at least a polyvinylidene fluoride type resin and a filler. The adhesive porous layer may contain a resin other than the polyvinylidene fluoride type resin. The filler contained in the adhesive porous layer may be either an inorganic filler or an organic filler.

—Polyvinylidene Fluoride Type Resin—

The content of the polyvinylidene fluoride type resin contained in the adhesive porous layer is preferably from 85% by mass to 100% by mass, more preferably from 90% by mass to 100% by mass, and still more preferably from 95% by mass to 100% by mass with respect to the total amount of all the resins contained in the adhesive porous layer.

When the adhesive porous layers are provided on both sides of the porous substrate, the type or amount of a polyvinylidene fluoride type resin contained in one of the adhesive porous layers and the type or amount of a polyvinylidene fluoride type resin contained in the other adhesive porous layer may be the same or different.

Examples of the polyvinylidene fluoride type resin include: a homopolymer of vinylidene fluoride (that is, polyvinylidene fluoride); a copolymer of vinylidene fluoride and a halogen-containing monomer such as hexafluoropropylene, tetrafluoroethylene, trifluoroethylene, chlorotrifluoroethylene, vinyl fluoride, or trichloroethylene; a copolymer of vinylidene fluoride and a monomer other than a halogen-containing monomer; a copolymer of vinylidene fluoride, a halogen-containing monomer, and a monomer other than the halogen-containing monomer; and a mixture thereof. The polyvinylidene fluoride type resin may be used singly or in combination of two or more types thereof.

The polyvinylidene fluoride type resin is preferably a copolymer of vinylidene fluoride (VDF) and hexafluoropropylene (HFP) (VDF-HFP copolymer) from a viewpoint of the adhesion to an electrode. In the disclosure, the VDF-HFP copolymer includes both a copolymer obtained by polymerizing only VDF and HFP and a copolymer obtained by polymerizing VDF, HFP, and another monomer. The VDF-HFP copolymer can control crystallinity, heat resistance, solubility resistance to an electrolytic solution, and the like of the copolymer within appropriate ranges by increasing or decreasing the content of the HFP unit.

In all of the polyvinylidene fluoride type resin contained in the adhesive porous layer, a content ratio of structural units derived from HFP is preferably from more than 3.5 mol % to 7.0 mol % with respect to a total of structural units.

When the content ratio of the structural units derived from HFP to all the structural units in the polyvinylidene fluoride type resin is more than 3.5 mol %, a polymer chain of the polyvinylidene fluoride type resin easily moves, and excellent adhesion to an electrode is obtained even when hot pressing in a state where the polyvinylidene fluoride type resin is not swollen in an electrolytic solution or hot pressing at a relatively low temperature is performed. The content ratio of the structural units derived from HFP is more preferably more than 4.0 mol %, and still more preferably more than 4.5 mol % from this viewpoint.

When the content ratio of the structural units derived from HFP to all the structural units in the polyvinylidene fluoride type resin is 7.0 mol % or less, excellent solubility resistance to an electrolytic solution is obtained. The content ratio of the structural units derived from HFP is more preferably 6.8 mol % or less, and still more preferably 6.5 mol % or less from this viewpoint.

The polyvinylidene fluoride type resin preferably contains a polyvinylidene fluoride type resin having a structural unit derived from a monomer represented by the following Formula (1) (referred to as "polyvinylidene fluoride type resin (1)" in the present disclosure).

Formula (1)

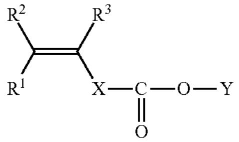

In Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or $—R—O—C(=O)—(CH_2)_n—C(=O)—OH$, wherein R represents a $C_{1-5}$ alkylene group and n represents an integer of 0 or more.

In Formula (1), a halogen atom represented by $R^1$, $R^2$, and $R^3$ may be any of a fluorine atom, a chlorine atom, a bromine atom, and an iodine atom, and is preferably the fluorine atom.

In Formula (1), examples of the alkyl group having 1 to 5 carbon atoms represented by $R^1$, $R^2$, and $R^3$ include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. The alkyl group having 1 to 5 carbon atoms in $R^1$, $R^2$, and $R^3$ is preferably an alkyl group having 1 to 4 carbon atoms, and more preferably an alkyl group having 1 to 3 carbon atoms.

In the Formula (1), examples of the derivative of the carboxyl group represented by $R^1$, $R^2$, and $R^3$ include-$C(=O)—OR^4$ ($R^4$ represents an alkyl group). Examples of $R^4$ include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. $R^4$ is preferably an alkyl group having 1 to 5 carbon atoms, more preferably an alkyl group having 1 to 4 carbon atoms, and still more preferably an alkyl group having 1 to 3 carbon atoms.

In the Formula (1), examples of the alkylene group having 1 to 5 carbon atoms represented by X include a methylene group, an ethylene group, an n-propylene group, an n-butylene group, and an n-pentylene group which are linear alkylene groups; and an isopropylene group, an isobutylene group, a sec-butylene group, a tert-butylene group, an isopentylene group, a neopentylene group, and a tert-pentylene group which are branched alkylene groups. The alkylene group having 1 to 5 carbon atoms in X is preferably an alkylene group having 1 to 4 carbon atoms, and more preferably an alkylene group having 1 to 3 carbon atoms.

In the Formula (1), examples of the substituent in the alkylene group having 1 to 5 carbon atoms having a substituent represented by X include a halogen atom, and may be any of a fluorine atom, a chlorine atom, a bromine atom, and an iodine atom. Examples of the substituted alkylene group having 1 to 5 carbon atoms in X include a methylene group, an ethylene group, an n-propylene group, an n-butylene group, and an n-pentylene group which are linear alkylene groups; and an isopropylene group, an isobutylene group, a sec-butylene group, a tert-butylene group, an isopentylene group, a neopentylene group, and a tert-pentylene group which are branched alkylene groups. The alkylene group having 1 to 5 carbon atoms substituted in X is preferably an alkylene group having 1 to 4 carbon atoms, and more preferably an alkylene group having 1 to 3 carbon atoms.

In the Formula (1), examples of the alkyl group having 1 to 5 carbon atoms represented by Y include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. The alkyl group having 1 to 5 carbon atoms in Y is preferably an alkyl group having 1 to 4 carbon atoms, and more preferably an alkyl group having 1 to 3 carbon atoms.

In the Formula (1), examples of the substituted alkyl group having 1 to 5 carbon atoms in the alkyl group having 1 to 5 carbon atoms substituted with at least one hydroxy group represented by Y include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. As the substituted alkyl group having 1 to 5 carbon atoms in Y, an alkyl group having 1 to 4 carbon atoms is preferable, and an alkyl group having 1 to 3 carbon atoms is more preferable. The number of substitutions of the hydroxy group is preferably one or two, and more preferably one.

In Formula (1), examples of the alkyl group having 1 to 5 carbon atoms substituted with at least one hydroxy group represented by Y include a 2-hydroxyethyl group, a 2-hydroxypropyl group, and a 4-hydroxybutyl group.

In Formula (1), examples of the substituted alkyl group having 1 to 5 carbon atoms in the alkyl group having 1 to 5 carbon atoms substituted with at least one carboxyl group represented by Y include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. As the substituted alkyl group having 1 to 5 carbon atoms in Y, an alkyl group having 1 to 4 carbon atoms is preferable, and an alkyl group having 1 to 3 carbon atoms is more preferable. The number of substitutions of the carboxyl group is preferably one or two, and more preferably one.

In Formula (1), examples of the alkyl group having 1 to 5 carbon atoms substituted with at least one carboxyl group represented by Y include a 2-carboxyl group, a 2-carboxypropyl group, and a 4-carboxybutyl group.

In Formula (1), in-$R—O—C(=O)—(CH_2)_n—C(=O)—OH$ represented by Y, R represents an alkylene group having 1 to 5 carbon atoms, and n represents an integer of 0 or more.

Examples of R include a methylene group, an ethylene group, an n-propylene group, an n-butylene group, and an n-pentylene group which are linear alkylene groups; and an isopropylene group, an isobutylene group, a sec-butylene group, a tert-butylene group, an isopentylene group, a neopentylene group, and a tert-pentylene group which are branched alkylene groups. R is preferably an alkylene group having 1 to 4 carbon atoms, and more preferably an alkylene group having 1 to 3 carbon atoms.

n is preferably an integer of 0 to 5, more preferably an integer of 1 to 4, and still more preferably 2 or 3.

Specific examples of the group include-$(CH_2)_2—O—C(=O)—(CH_2)_2—C(=O)—OH$.

Examples of the monomers represented by Formula (1) include monomers in which $R^1$, $R^2$, and $R^3$ are each independently a hydrogen atom or an alkyl group having 1 to 4 carbon atoms, and X is a single bond, and monomers in which Y is an alkyl group having 1 to 4 carbon atoms or an alkyl group having 1 to 3 carbon atoms substituted with at least one hydroxy group.

Examples of the monomers represented by Formula (1) include acrylic monomer, unsaturated dibasic acid, monoester of unsaturated dibasic acid, and the like.

Examples of the acrylic monomers include (meth)acrylic acid, (meth)methyl acrylate, ethyl (meth)acrylate, isopropyl (meth)acrylate, n-Butyl (meth)acrylate, isobutyl (meth)acrylate, tert-butyl (meth)acrylate, pentyl (meth)acrylate, 2-hydroxyethyl (meth)acrylate, 2-hydroxypropyl (meth)acrylate, 4-hydroxybutyl (meth)acrylate, 2-carboxyethyl (meth)acrylate, 2-carboxypropyl (meth)acrylate, 4-carboxybutyl (meth)acrylate, butenoic acid, pentenoic acid, hexenoic acid, (meth)acryloyloxyethyl succinate, and the like. In the disclosure, the notation "(meth)acryl" means either "acryl" or "methacryl".

Examples of the unsaturated dibasic acid include unsaturated dicarboxylic acid, and more specific examples of the unsaturated dibasic acid include maleic acid, maleic anhydride, citraconic acid, itaconic acid, and the like.

Examples of the monoester of the unsaturated dibasic acid include maleic acid monomethyl ester, maleic acid monoethyl ester, citraconic monomethyl ester, citraconic monoethyl ester, itaconic monomethyl ester, itaconic acid monoethyl ester, and the like, and among them, maleic acid monomethyl ester, and citraconic acid monomethyl ester are preferable.

In the polyvinylidene fluoride type resin (1), a content ratio of the structural units derived from the monomer represented by Formula (1) is preferably 0.005 mol % or more, more preferably 0.01 mol % or more, and still more preferably 0.02 mol % or more with respect to a total of structural units from a viewpoint of adhesion to an electrode.

In the polyvinylidene fluoride type resin (1), the content ratio of the structural units derived from the monomer represented by Formula (1) is preferably 3.0 mol % or less, more preferably 2.0 mol % or less, and still more preferably 1.0 mol % or less with respect to a total of structural units from a viewpoint of a low influence on an active material contained in the electrode.

The polyvinylidene fluoride type resin (1) may contain a structural units derived from a monomer other than vinylidene fluoride (VDF) and the monomer represented by Formula (1). Examples of the other monomer include halogen-containing monomers such as hexafluoropropylene, tetrafluoroethylene, trifluoroethylene, chlorotrifluoroethylene, vinyl fluoride, and trichloroethylene.

The polyvinylidene fluoride type resin (1) preferably contains a structural units derived from hexafluoropropylene (HFP). In the polyvinylidene fluoride type resin (1), crystallinity of the resin, adhesion to an electrode, solubility resistance to an electrolytic solution, and the like can be controlled within appropriate ranges by increasing or decreasing a ratio of HFP to all the polymerization components.

The polyvinylidene fluoride type resin (1) is preferably a terpolymer containing VDF, HFP, and the monomer represented by Formula (1). The terpolymer is preferably a VDF-HFP-acrylic acid terpolymer.

A content ratio of the polyvinylidene fluoride type resin (1) to all of the polyvinylidene fluoride type resin contained in the adhesive porous layer is preferably from 20% by mass to 80% by mass, more preferably from 30% by mass to 70% by mass, and still more preferably from 40% by mass to 60% by mass from a viewpoint of setting an acid value of all of the polyvinylidene fluoride type resin within an appropriate range.

An acid value (mgKOH/g) of all of the polyvinylidene fluoride type resin contained in the adhesive porous layer is preferably less than 3.0, more preferably 2.8 or less, and still more preferably 2.6 or less from a viewpoint of a low influence on an active material contained in the electrode.

The acid value (mgKOH/g) of all of the polyvinylidene fluoride type resin contained in the adhesive porous layer is preferably 0.5 or more, more preferably 0.8 or more, and still more preferably 1.0 or more from a viewpoint of adhesion to an electrode.

The acid value (mgKOH/g) of all of the polyvinylidene fluoride type resin contained in the adhesive porous layer is determined by extracting the polyvinylidene fluoride type resin contained in the adhesive porous layer and measuring an acid value of the extracted polyvinylidene fluoride type resin by a potentiometric titration method (JIS K1557-5: 2007). Alternatively, an acid value (mgKOH/g) of a polyvinylidene fluoride type resin used for forming the adhesive porous layer is measured by a potentiometric titration method (JIS K1557-5: 2007).

A weight-average molecular weight (Mw) of all of the polyvinylidene fluoride type resin contained in the adhesive porous layer is preferably 300,000 or more, more preferably 500,000 or more, still more preferably 650,000 or more, and further still more preferably 850,000 or more from a viewpoint that pores of the adhesive porous layer are less likely to be blocked when heat is applied to the adhesive porous layer during manufacture of a battery.

The Mw of all of the polyvinylidene fluoride type resin contained in the adhesive porous layer is preferably less than 3,000,000, more preferably less than 2,500,000, still more preferably less than 2,300,000, and further still more preferably less than 2,000,000 from a viewpoint that the polyvinylidene fluoride type resin is appropriately softened when heat is applied to the adhesive porous layer during manufacture of a battery, and the adhesive porous layer and the electrode are favorably bonded to each other.

The Mw of all of the polyvinylidene fluoride type resin contained in the adhesive porous layer is a molecular weight in terms of polystyrene, measured by gel permeation chromatography (GPC). A polyvinylidene fluoride type resin extracted from the adhesive porous layer or a polyvinylidene fluoride type resin used for forming the adhesive porous layer is used as a sample.

The adhesive porous layer preferably contains a polyvinylidene fluoride type resin X and a polyvinylidene fluoride type resin Y described below from a viewpoint of controlling an endothermic peak temperature and an exothermic peak temperature in a DSC curve related to the polyvinylidene fluoride type resin contained in the adhesive porous layer within desired ranges.

The total amount of the polyvinylidene fluoride type resin X and the polyvinylidene fluoride type resin Y contained in the adhesive porous layer is preferably from 85% by mass to 100% by mass, more preferably from 90% by mass to 100% by mass, and still more preferably from 95% by mass to 100% by mass with respect to the total amount of the polyvinylidene fluoride type resin contained in the adhesive porous layer.

—Polyvinylidene Fluoride Type Resin X—

The polyvinylidene fluoride type resin X contains structural units derived from vinylidene fluoride (VDF) and structural units derived from hexafluoropropylene (HFP), has a content ratio of structural units derived from HFP of from more than 3.5 mol % to 15 mol % with respect to a total of structural units, has a weight-average molecular weight (Mw) of from 100,000 to less than 1,000,000, and has a melting point of from 125° C. to less than 150° C.

In the polyvinylidene fluoride type resin X, the content ratio of the structural units derived from HFP is more than 3.5 mol %, preferably more than 4.0 mol %, more preferably more than 4.5 mol %, and still more preferably more than 5.0 mol % with respect to a total of structural units, from a viewpoint that a polymer chain of the resin easily moves by hot pressing and adhesion to an electrode is excellent.

In the polyvinylidene fluoride type resin X, the content ratio of the structural units derived from HFP is 15 mol % or less, preferably 12 mol % or less, more preferably 10 mol % or less, and still more preferably 8.0 mol % or less with respect to a total of structural units, because solubility resistance to an electrolytic solution is excellent.

The Mw of the polyvinylidene fluoride type resin X is 100,000 or more, preferably 150,000 or more, more preferably 200,000 or more, and still more preferably 250,000 or more from a viewpoint that pores of the adhesive porous layer are less likely to be blocked when heat is applied to the adhesive porous layer during manufacture of a battery.

The Mw of the polyvinylidene fluoride type resin X is less than 1,000,000, preferably less than 900,000, more preferably less than 600,000, and still more preferably less than 400,000 from a viewpoint that the resin is softened when heat is applied to the adhesive porous layer during manufacture of a battery, and the adhesive porous layer and the electrode are favorably bonded to each other.

The Mw of the polyvinylidene fluoride type resin X is a molecular weight in terms of polystyrene, measured by GPC. The polyvinylidene fluoride type resin X used for forming the adhesive porous layer is used as a sample.

A melting point of the polyvinylidene fluoride type resin X is 125° C. or more, preferably 128° C. or more, and more preferably 130° C. or more from a viewpoint that pores of the adhesive porous layer are less likely to be blocked when heat is applied to the adhesive porous layer during manufacture of a battery.

The melting point of the polyvinylidene fluoride type resin X is less than 150° C., preferably less than 145° C., and more preferably less than 140° C. from a viewpoint that the resin is softened when heat is applied to the adhesive porous layer during manufacture of a battery, and the adhesive porous layer and the electrode are favorably bonded to each other.

The melting point of the polyvinylidene fluoride type resin X is determined from a DSC curve obtained by performing differential scanning calorimetry (DSC). The polyvinylidene fluoride type resin X used for forming the adhesive porous layer is used as a sample. A sample is put in an aluminum sample pan, set in a measuring apparatus, and the following three steps are continuously performed in a nitrogen atmosphere to perform thermal analysis of the sample.

Step 1: Temperature is raised from 30° C. to 200° C. at a rate of 5° C./min.

Step 2: Temperature is lowered from 200° C. to 30° C. at a rate of 5° C./min.

Step 3: Temperature is raised from 30° C. to 200° C. at a rate of 5° C./min.

A temperature of an endothermic peak appearing in the DSC curve in the Step 3 is defined as the melting point of the polyvinylidene fluoride type resin X. When there are a plurality of endothermic peaks, a temperature of an endothermic peak on the lowest temperature side is defined as the melting point.

A preferable embodiment of the polyvinylidene fluoride type resin X is an embodiment in which the content ratio of the structural units derived from HFP is from more than 5.0 mol % to 15 mol % with respect to a total of structural units, the Mw is from 300,000 to less than 1,000,000, and the melting point is from 125° C. to less than 140° C.

—Polyvinylidene Fluoride Type Resin Y—

The polyvinylidene fluoride type resin Y contains structural units derived from vinylidene fluoride (VDF) and optionally contains structural units derived from hexafluoropropylene (HFP), has a content ratio of the structural units derived from HFP of from 0 mol % to 3.5 mol % with respect to a total of structural units, has a weight-average molecular weight (Mw) of from 1,000,000 to less than 3,000,000, and has a melting point of from 150° C. to less than 180° C.

In the polyvinylidene fluoride type resin Y, the content ratio of the structural units derived from HFP is 3.5 mol % or less, preferably 3.0 mol % or less, more preferably 2.5 mol % or less, and still more preferably 2.0 mol % or less with respect to a total of structural units, because solubility resistance to an electrolytic solution is excellent.

In the polyvinylidene fluoride type resin Y, the content ratio of the structural units derived from HFP is preferably more than 0 mol %, more preferably 0.2 mol % or more, still more preferably 0.5 mol % or more, and further still more preferably 0.7 mol % or more with respect to a total of structural units, from a viewpoint that a polymer chain of the resin easily moves by hot pressing and adhesion to an electrode is excellent.

A Mw of the polyvinylidene fluoride type resin Y is 1,000,000 or more, preferably 1,200,000 or more, more preferably 1,500,000 or more, and still more preferably 1,600,000 or more from a viewpoint that pores of the adhesive porous layer are less likely to be blocked when heat is applied to the adhesive porous layer during manufacture of a battery.

The Mw of the polyvinylidene fluoride type resin Y is less than 3,000,000, preferably less than 2,500,000, more preferably less than 2,300,000, and still more preferably less than 2,000,000 from a viewpoint that the resin is appropriately softened when heat is applied to the adhesive porous layer during manufacture of a battery, and the adhesive porous layer and the electrode are favorably bonded to each other.

The Mw of the polyvinylidene fluoride type resin Y is a molecular weight in terms of polystyrene, measured by GPC. The polyvinylidene fluoride type resin Y used for forming the adhesive porous layer is used as a sample.

A melting point of the polyvinylidene fluoride type resin Y is 150° C. or more, preferably 155° C. or more, and more preferably 160° C. or more from a viewpoint that pores of the adhesive porous layer are less likely to be blocked when heat is applied to the adhesive porous layer during manufacture of a battery.

The melting point of the polyvinylidene fluoride type resin Y is less than 180° C., preferably less than 175° C., and more preferably less than 170° C. from a viewpoint that the resin is appropriately softened when heat is applied to the adhesive porous layer during manufacture of a battery, and the adhesive porous layer and the electrode are favorably bonded to each other.

The melting point of the polyvinylidene fluoride type resin Y is determined from a DSC curve obtained by performing differential scanning calorimetry (DSC). The polyvinylidene fluoride type resin Y used for forming the adhesive porous layer is used as a sample. A sample is put in an aluminum sample pan, set in a measuring apparatus, and the following three steps are continuously performed in a nitrogen atmosphere to perform thermal analysis of the sample.

Step 1: Temperature is raised from 30° C. to 200° C. at a rate of 5° C./min.

Step 2: Temperature is lowered from 200° C. to 30° C. at a rate of 5° C./min.

Step 3: Temperature is raised from 30° C. to 200° C. at a rate of 5° C./min.

A temperature of an endothermic peak appearing in the DSC curve in the step 3 is defined as the melting point of the polyvinylidene fluoride type resin Y. When there are a plurality of endothermic peaks, a temperature of an endothermic peak on the lowest temperature side is defined as the melting point.

A preferable embodiment of the polyvinylidene fluoride type resin Y is an embodiment in which the content ratio of the structural units derived from HFP is from 0 mol % (preferably more than 0 mol %, more preferably 0.2 mol % or more) to 2.0 mol % with respect to a total of structural units, the Mw is from 1,500,000 to less than 2,000,000, and the melting point is from 150° C. to less than 170° C.

The polyvinylidene fluoride type resin Y is preferably a polyvinylidene fluoride type resin having structural units derived from the monomer represented by the above-described Formula (1). That is, the polyvinylidene fluoride type resin Y is preferably the polyvinylidene fluoride type resin (1). That is, the polyvinylidene fluoride type resin Y is preferably a terpolymer containing VDF, HFP, and the monomer represented by Formula (1). The terpolymer is preferably a VDF-HFP-acrylic acid terpolymer.

In the polyvinylidene fluoride type resin Y, a content ratio of the structural units derived from the monomer represented by Formula (1) is preferably 0.05 mol % or more, more preferably 0.08 mol % or more, and still more preferably 0.1 mol % or more with respect to a total of structural units from a viewpoint of adhesion to an electrode.

In the polyvinylidene fluoride type resin Y, the content ratio of the structural units derived from the monomer represented by Formula (1) is preferably 5.0 mol % or less, more preferably 4.0 mol % or less, and still more preferably 3.0 mol % or less with respect to a total of structural units from a viewpoint of a low influence on an active material contained in the electrode.

A mass ratio between the polyvinylidene fluoride type resin X and the polyvinylidene fluoride type resin Y contained in the adhesive porous layer is preferably polyvinylidene fluoride type resin X: polyvinylidene fluoride type resin Y=20:80 to 80:20, more preferably 30:70 to 70:30, still more preferably 35:65 to 65:35, and further still more preferably 40:60 to 60:40 from a viewpoint of controlling an endothermic peak temperature and an exothermic peak temperature in a DSC curve related to the polyvinylidene fluoride type resin contained in the adhesive porous layer within desired ranges.

A difference between the melting point of the polyvinylidene fluoride type resin X and the melting point of the polyvinylidene fluoride type resin Y contained in the adhesive porous layer is preferably 25° C. or more, more preferably 27° C. or more, still more preferably 28° C. or more, and further still more preferably 29° C. or more from a viewpoint of achieving both adhesion to an electrode by dry heat press and wet heat press and a high capacity retention ratio of the battery even after exposure to a high temperature.

The difference between the melting point of the polyvinylidene fluoride type resin X and the melting point of the polyvinylidene fluoride type resin Y contained in the adhesive porous layer is preferably less than 55° C., more preferably less than 50° C., still more preferably less than 45° C., and further still more preferably less than 40° C. from a viewpoint of forming a highly uniform porous structure in the adhesive porous layer.

—Other Resins—

The adhesive porous layer may contain resins other than the polyvinylidene fluoride type resin. Examples of the other resins include an acrylic type resin, a fluorinated rubber, a styrene-butadiene copolymer, a homopolymer or a copolymer of vinyl nitrile compounds (acrylonitrile, methacrylonitrile, and the like), carboxymethyl cellulose, hydroxyalkyl cellulose, polyvinyl alcohol, polyvinyl butyral, polyvinyl pyrrolidone, polyether (polyethylene oxide, polypropylene oxide, and the like), polyamide, wholly aromatic polyamide, polyimide, polyamideimide, polysulfone, polyketone, polyether ketone, polyether sulfone, polyether imide, and mixtures thereof.

The content of other resins other than the polyvinylidene fluoride type resin contained in the adhesive porous layer is preferably from 0% by mass to 15% by mass, more preferably from 0% by mass to 10% by mass, and still more preferably from 0% by mass to 5% by mass with respect to a total amount of all the resins contained in the adhesive porous layer.

—Inorganic Filler—

Examples of the inorganic filler include metal hydroxide particles, metal sulfate particles, metal oxide particles, metal carbonate particles, metal nitride particles, metal fluoride particles, and clay mineral particles. The inorganic filler may be used singly or in combination of two or more types thereof.

Examples of a metal hydroxide constituting the metal hydroxide particles include magnesium hydroxide, aluminum hydroxide, calcium hydroxide, chromium hydroxide, zirconium hydroxide, cerium hydroxide, and nickel hydroxide.

Examples of a metal sulfate constituting the metal sulfate particles include barium sulfate, strontium sulfate, calcium sulfate, calcium sulfate dihydrate, alum, and jarosite.

Examples of a metal oxide constituting the metal oxide particles include barium titanate ($BaTiO_3$), magnesium oxide, alumina ($Al_2O_3$), boehmite (alumina monohydrate), titania ($TiO_2$), silica ($SiO_2$), zirconia ($ZrO_2$), and zinc oxide.

Examples of a metal carbonate constituting the metal carbonate particles include calcium carbonate and magnesium carbonate.

Examples of a metal nitride constituting the metal nitride particles include magnesium nitride, aluminum nitride, calcium nitride, and titanium nitride.

Examples of a metal fluoride constituting the metal fluoride particles include magnesium fluoride and calcium fluoride.

Examples of a clay mineral constituting the clay mineral particles include calcium silicate, calcium phosphate, apatite, and talc.

The inorganic filler may be an inorganic filler surface-modified with a silane coupling agent or the like.

The inorganic filler is preferably at least one selected from the group consisting of metal hydroxide particles, metal sulfate particles, and barium titanate particles from a viewpoint that an electrolytic solution or an electrolyte is hardly decomposed and thus gas is hardly generated.

The total amount of metal hydroxide particles, metal sulfate particles, and barium titanate particles to the entire inorganic filler contained in the adhesive porous layer is preferably 80% by mass or more, more preferably 85% by mass or more, still more preferably 90% by mass or more, further still more preferably 95% by mass or more, and most preferably 100% by mass from a viewpoint of suppressing generation of gas.

When the adhesive porous layers are provided on both sides of the porous substrate, the type of an inorganic filler contained in one of the adhesive porous layers and the type of an inorganic filler contained in the other adhesive porous layer may be the same or different.

The particle shape of the inorganic filler is not limited, and may be any of a spherical shape, a plate shape, a needle shape, and an irregular shape. The inorganic filler is preferably constituted by spherical or plate-shaped particles from a viewpoint of suppressing a short circuit of a battery or from a viewpoint of forming a highly uniform adhesive porous layer.

An average primary particle size of all of the inorganic filler contained in the adhesive porous layer is preferably 1.5 μm or less, more preferably 1.2 μm or less, and still more preferably 1.0 μm or less from a viewpoint of enhancing heat resistance of the adhesive porous layer.

The average primary particle size of all of the inorganic filler contained in the adhesive porous layer is preferably 0.01 μm or more, more preferably 0.05 μm or more, still more preferably 0.08 μm or more, and further still more preferably 0.1 μm or more from a viewpoint of suppressing aggregation of particles of the inorganic filler to form a highly uniform adhesive porous layer.

The average primary particle size of all of the inorganic filler contained in the adhesive porous layer is determined by measuring major diameters of 100 inorganic filler particles randomly selected in observation with a scanning electron microscope (SEM), and averaging the major diameters of the 100 particles. A sample to be subjected to SEM observation is an inorganic filler which is a material for forming the adhesive porous layer, or an inorganic filler taken out from the adhesive porous layer of the separator. There is no limitation on a method for taking out the inorganic filler from the adhesive porous layer of the separator. Examples of the method include: a method for immersing the adhesive porous layer peeled off from the separator in an organic solvent that dissolves the resin to dissolve the resin in the organic solvent, and taking out the inorganic filler; and a method for heating the adhesive porous layer peeled off from the separator to about 800° C. to dissipate the resin and taking out the inorganic filler.

When the adhesive porous layers are provided on both sides of the porous substrate, the average primary particle size of an inorganic filler in one of the adhesive porous layers and the average primary particle size of an inorganic filler in the other adhesive porous layer may be the same or different.

A ratio of the inorganic filler to the solid content volume of the adhesive porous layer is preferably 30% by volume or more, more preferably 35% by volume or more, still more preferably 40% by volume or more, and further still more preferably 45% by volume or more from a viewpoint of heat resistance of the separator.

The ratio of the inorganic filler to the solid content volume of the adhesive porous layer is preferably 90% by volume or less, more preferably 85% by volume or less, still more preferably 80% by volume or less, and further still more preferably 75% by volume or less from a viewpoint that the adhesive porous layer is less likely to be peeled off from the porous substrate.

The ratio V (% by volume) of the inorganic filler to the solid content volume of the adhesive porous layer is determined by the following formula.

$$V=\{(Xa/Da)/(Xa/Da+Xb/Db+Xc/Dc+\ldots+Xn/Dn)\}\times 100$$

Here, among the constituent materials of the adhesive porous layer, the inorganic filler is represented by a, and the other constituent materials are represented by b, c, . . . , and n, respectively, the masses of the constituent materials contained in the adhesive porous layer having a predetermined area are represented by Xa, Xb, Xc, . . . , and Xn (g), respectively, and the true densities of the constituent materials are represented by Da, Db, Dc, . . . , and Dn (g/cm$^3$), respectively.

Xa or the like substituted in the above formula is the mass (g) of a constituent material used for forming the adhesive porous layer having a predetermined area or the mass (g) of a constituent material taken out from the adhesive porous layer having a predetermined area.

Da or the like substituted in the above formula is the true density (g/cm$^3$) of a constituent material used for forming the adhesive porous layer or the true density (g/cm$^3$) of a constituent material taken out from the adhesive porous layer.

When the adhesive porous layers are provided on both sides of the porous substrate, a volume ratio of an inorganic filler to the solid content volume of one of the adhesive porous layers and a volume ratio of an inorganic filler to the solid content volume of the other adhesive porous layer may be the same or different.

A ratio of the inorganic filler to the total amount of the filler (that is, the total amount of the inorganic filler and the organic filler) contained in the adhesive porous layer is preferably 90% by mass or more, more preferably 95% by mass or more, and still more preferably 100% by mass from a viewpoint of heat resistance of the separator.

—Organic Filler—

Examples of the organic filler include crosslinked polymer particles of a crosslinked poly(meth)acrylic acid, a crosslinked poly(meth)acrylic acid ester, a crosslinked polysilicone, a crosslinked polystyrene, a crosslinked polydivinylbenzene, a crosslinked product of a styrene-divinylbenzene copolymer, a polyimide, a melamine resin, a phenol resin, a benzoguanamine-formaldehyde condensate, or the like; and heat resistant polymer particles of polysulfone, polyacrylonitrile, aramide, polyacetal, thermoplastic polyimide, or the like. In the disclosure, the notation "(meth) acryl" means either "acryl" or "methacryl".

The resin that constitutes the organic filler may be a mixture, a modified product, a derivative, a copolymer (such as, a random copolymer, an alternating copolymer, a block copolymer, and a graft copolymer), or a crosslinked body, of the above-exemplified material.

The organic filler may be used singly or in combination of two or more thereof.

A ratio of the entire filler (that is, a total ratio of an inorganic filler and an organic filler) to the solid content volume of the adhesive porous layer is preferably 30% by volume or more, more preferably 35% by volume or more, still more preferably 40% by volume or more, and further still more preferably 45% by volume or more from a viewpoint of heat resistance of the separator.

The ratio of the entire filler to the solid content volume of the adhesive porous layer is preferably 90% by volume or less, more preferably 85% by volume or less, still more preferably 80% by volume or less, and further still more preferably 75% by volume or less from a viewpoint that the adhesive porous layer is less likely to be peeled off from the porous substrate.

The ratio V (% by volume) of the entire filler to the solid content volume of the adhesive porous layer is determined by the following formula.

$$V=\{(Xa/Da)/(Xa/Da+Xb/Db+Xc/Dc+\ldots+Xn/Dn)\}\times 100$$

Here, among the constituent materials of the adhesive porous layer, the filler is represented by a, and the other constituent materials are represented by b, c, . . . , and n, respectively, the masses of the constituent materials contained in the adhesive porous layer having a predetermined area are represented by Xa, Xb, Xc . . . , and Xn (g), respectively, and the true densities of the constituent materials are represented by Da, Db, Dc, . . . , and Dn (g/cm$^3$), respectively.

Xa or the like substituted in the above formula is the mass (g) of a constituent material used for forming the adhesive porous layer having a predetermined area or the mass (g) of a constituent material taken out from the adhesive porous layer having a predetermined area.

Da or the like substituted in the above formula is the true density (g/cm$^3$) of a constituent material used for forming the adhesive porous layer or the true density (g/cm$^3$) of a constituent material taken out from the adhesive porous layer.

—Other Components—

The adhesive porous layer may contain an additive, for example, a dispersant such as a surfactant, a wetting agent, an antifoaming agent, or a pH adjuster. The dispersant is added to a coating liquid for forming an adhesive porous layer for the purpose of improving dispersibility, coatability, or storage stability. The wetting agent, the antifoaming agent, or the pH adjuster is added to a coating liquid for forming an adhesive porous layer for the purpose of, for example, improving compatibility with the porous substrate, suppressing mixing of air into the coating liquid, or adjusting the pH.

[Characteristics of Adhesive Porous Layer]

The thickness of the adhesive porous layer is preferably 0.5 μm or more on one side, more preferably 1.0 μm or more on one side, and still more preferably 1.5 μm or more on one side from a viewpoint of adhesion to an electrode or handleability, and is preferably 10.0 μm or less on one side, more preferably 8.0 μm or less on one side, and still more preferably 6.0 μm or less on one side from a viewpoint of ion permeability and an energy density of the battery.

When the adhesive porous layers are provided on both sides of the porous substrate, the thickness of the adhesive porous layer is preferably 1.0 μm or more, more preferably 2.0 μm or more, still more preferably 3.0 μm or more, and preferably 20.0 μm or less, more preferably 16.0 μm or less, still more preferably 12.0 μm or less as a total thickness thereof on both sides of the porous substrate.

When the adhesive porous layers are provided on both sides of the porous substrate, a difference (μm) between the thickness of one of the adhesive porous layers and the thickness of the other adhesive porous layer is preferably as small as possible, and is preferably 20% or less of the total thickness (μm) thereof on both sides.

When the adhesive porous layer is provided on one side of the porous substrate or the adhesive porous layers are provided on both sides of the porous substrate, the mass of the adhesive porous layer per unit area is preferably 1.0 g/$m^2$ or more, more preferably 2.0 g/$m^2$ or more, and still more preferably 3.0 g/$m^2$ or more as the total mass on both sides from a viewpoint of adhesion to an electrode or handleability, and is preferably 30.0 g/$m^2$ or less, more preferably 20.0 g/$m^2$ or less, and still more preferably 10.0 g/$m^2$ or less as the total mass on both sides from a viewpoint of ion permeability and an energy density of a battery.

When the adhesive porous layers are provided on both sides of the porous substrate, a difference (g/$m^2$) between the mass of one of the adhesive porous layers per unit area and the mass of the other adhesive porous layer per unit area is preferably as small as possible from a viewpoint of suppressing curling of the separator or a viewpoint of improving cycle characteristics of a battery, and is preferably 20% or less of the total mass (g/$m^2$) on both sides.

A porosity of the adhesive porous layer is preferably 30% or more, more preferably 35% or more, and still more preferably 40% or more from a viewpoint of ion permeability, and is preferably 70% or less, more preferably 65% or less, and still more preferably 60% or less from a viewpoint of mechanical strength of the adhesive porous layer and adhesion to an electrode. The porosity & (%) of the adhesive porous layer is determined by the following formula.

$$\varepsilon = \left(1 - \frac{\sum_{i=1}^{n} \frac{Wi}{di}}{t}\right) \times 100$$

Here, the masses of constituent materials 1, 2, 3, . . . , and n of the adhesive porous layer per unit area are represented by $W_1$, $W_2$, $W_3$, . . . , and $W_n$ (g/$cm^2$), respectively, the true densities of the constituent materials are represented by $d_1$, $d_2$, $d_3$, . . . , and $d_n$ (g/$cm^3$), respectively, and the thickness of the adhesive porous layer is represented by t (cm).

An average pore size of the adhesive porous layer is preferably from 10 nm to 200 nm. In a case where the average pore size is 10 nm or more, when the adhesive porous layer is impregnated with an electrolytic solution, pores are hardly blocked even if a resin contained in the adhesive porous layer is swollen. In a case where the average pore size is 200 nm or less, uniformity in ion transfer in the adhesive porous layer is high, and a battery has excellent cycle characteristics and load characteristics.

The average pore size (nm) of the adhesive porous layer is calculated by the following formula, assuming that all pores are cylindrical.

$$d = 4V/S$$

In the formula, d represents an average pore size (diameter) of the adhesive porous layer, V represents a pore volume per square meter of the adhesive porous layer, and S represents a pore surface area per square meter of the adhesive porous layer.

The pore volume V per square meter of the adhesive porous layer is calculated from the porosity of the heat-resistant porous layer.

The pore surface area S per square meter of the adhesive porous layer is determined by the following method.

First, a specific surface area ($m^2$/g) of the porous substrate and a specific surface area ($m^2$/g) of the separator are calculated from a nitrogen gas adsorption amount by applying a BET formula to a nitrogen gas adsorption method. These specific surface areas ($m^2$/g) are multiplied by basis weights (g/$m^2$) of the porous substrate and the separator, respectively, to calculate a pore surface area per square meter. Then, the pore surface area per square meter of the porous substrate is subtracted from the pore surface area per square meter of the separator to calculate the pore surface area S per square meter of the adhesive porous layer. Basis weight refers to a mass per unit area.

[Characteristics of Separator]

The thickness of the separator is preferably 8 μm or more, more preferably 10 μm or more, and still more preferably 12 μm or more from a viewpoint of the mechanical strength of the separator, and is preferably 25 μm or less, more preferably 22 μm or less, and still more preferably 20 μm or less from a viewpoint of an energy density of the battery.

The Gurley value (JIS P8117: 2009) of the separator is preferably 50 sec/100 mL or more, more preferably 60 sec/100 mL or more, still more preferably 70 sec/100 mL or more, and further still more preferably 80 sec/100 mL or more from a viewpoint of suppression of battery short circuit. The Gurley value of the separator is preferably 200 sec/100 mL or less, more preferably 180 sec/100 mL or less, still more preferably 150 sec/100 mL or less, and further still more preferably 130 sec/100 mL or less from a viewpoint of ion permeability of the separator.

The separator preferably has a film resistance of from 1 Ω·$cm^2$ to 10 Ω·$cm^2$ from a viewpoint of load characteristics of a battery. Here, the film resistance of the separator refers to a resistance value in a state where the separator is impregnated with an electrolytic solution, and is measured by an AC method at temperature of 20° C. using 1 mol/L $LiBF_4$-propylene carbonate/ethylene carbonate (mass ratio 1:1) as the electrolytic solution. The separator with a lower film resistance value has better ion permeability.

[Method of Producing Separator]

The separator of the disclosure can be produced, for example, by forming the adhesive porous layer on the porous substrate by a wet coating method or a dry coating method. In the disclosure, the wet coating method is a method of solidifying a coating layer in a coagulation liquid, and the dry coating method is a method of drying a coating layer to solidify the coating layer. Hereinafter, embodiment examples of the wet coating method will be described.

The wet coating method is a method of applying a coating liquid containing a polyvinylidene fluoride type resin and a filler onto a porous substrate, immersing the resulting product in a coagulation liquid to solidify the coating layer, pulling the resulting product out of the coagulation liquid, washing the resulting product with water, and drying the resulting product.

The coating liquid for forming the adhesive porous layer is prepared by dissolving or dispersing a polyvinylidene fluoride type resin and a filler in a solvent. In the coating liquid, a component other than the polyvinylidene fluoride type resin and the filler is dissolved or dispersed, if necessary.

A solvent used for preparing the coating liquid includes a solvent that dissolves the polyvinylidene fluoride type resin (hereinafter, also referred to as "good solvent"). Examples of the good solvent include a polar amide solvent such as N-methylpyrrolidone, dimethylacetamide, or dimethylformamide.

The solvent used for preparing the coating liquid may contains a phase separation agent that induces phase separation from a viewpoint of forming a porous layer having a favorable porous structure. Therefore, the solvent used for preparing the coating liquid may be a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

In a case where the solvent used for preparing the coating liquid is a mixed solvent of a good solvent and a phase separation agent, the mixed solvent preferably contains 60% by mass or more of the good solvent and from 5% by mass to 40% by mass of the phase separation agent from a viewpoint of forming a favorable porous structure.

The resin concentration of the coating liquid is preferably from 1% by mass to 20% by mass from a viewpoint of forming a favorable porous structure. The filler concentration of the coating liquid is preferably from 0.5% by mass to 50% by mass from a viewpoint of forming a favorable porous structure.

The coating liquid may contain a dispersant such as a surfactant, a wetting agent, an antifoaming agent, or a pH adjuster. These additives may be those remain in the adhesive porous layer as long as the additives are electrochemically stable in the range of use of a non-aqueous secondary battery and do not inhibit the reaction in the battery.

Examples of a means of applying the coating liquid to the porous substrate include a Meyer bar, a die coater, a reverse roll coater, a roll coater, and a gravure coater. In a case where the adhesive porous layers are formed on both sides of the porous substrate, it is preferable to simultaneously apply the coating liquid to both sides of the porous substrate from a viewpoint of productivity.

The coating layer is solidified by immersing the porous substrate on which the coating layer is formed in a coagulation liquid, and solidifying the polyvinylidene fluoride type resin while phase separation is induced in the coating layer. As a result, a laminate composed of the porous substrate and the adhesive porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the laminate is pulled out of the coagulation liquid and washed with water. By washing the laminate with water, the coagulation liquid is removed from the laminate. Furthermore, by drying the laminate, water is removed from the laminate. Washing with water is performed, for example, by transporting the laminate in a water washing bath. Drying is performed, for example, by transporting the laminate in a high-temperature environment, blowing air to the laminate, or bringing the laminate into contact with a heat roll. The drying temperature is preferably from 40° C. to 80° C.

The separator of the present disclosure can also be produced by a dry coating method. The dry coating method is a method of applying a coating liquid to a porous substrate, drying the coating layer to remove a solvent by evaporation, and thereby forming a adhesive porous layer on the porous substrate.

The separator of the present disclosure can also be produced by a method of preparing a adhesive porous layer as an independent sheet, stacking the adhesive porous layer on a porous substrate, and forming a composite by thermal press bonding or an adhesive. Examples of the method of preparing an adhesive porous layer as an independent sheet include a method of forming an adhesive porous layer on a release sheet by applying the above-described wet coating method or dry coating method.

<Non-Aqueous Secondary Battery>

A non-aqueous secondary battery of the disclosure is a non-aqueous secondary battery that obtains an electromotive force by doping and dedoping lithium ion, and includes a positive electrode, a negative electrode, and a separator for a non-aqueous secondary battery of the disclosure. The doping means occlusion, support, adsorption, or insertion, and means a phenomenon that lithium ions enter an active material of an electrode such as a positive electrode.

The non-aqueous secondary battery of the disclosure has a structure in which, for example, a battery element in which a negative electrode and a positive electrode face each other with a separator interposed therebetween is enclosed in an exterior material together with an electrolytic solution. The non-aqueous secondary battery of the disclosure is suitable for a non-aqueous electrolyte secondary battery, particularly for a lithium ion secondary battery.

Hereinafter, aspect examples of the positive electrode, negative electrode, electrolyte solution, and exterior material included in the non-aqueous secondary battery according to the disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer. Examples of the conductive auxiliary agent include carbon materials such as acetylene black, Ketjen black, and graphite powder. Examples of the current collector include an aluminum foil, a titanium foil, and a stainless steel foil, each having a thickness of from 5 μm to 20 μm.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium ion. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, graphite powder, and extra fine carbon fiber. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L is preferable.

Examples of the exterior material include a metal can and an aluminum laminated film pack. The shape of the battery may be a square shape, a cylindrical shape, a coin shape, and the like, but the separator of the disclosure is suitable for any one of these shapes.

The non-aqueous secondary battery of the disclosure can be manufactured, for example, by any one of the following (1) to (3) using a laminate after the laminate in which the separator of the disclosure is disposed between the positive electrode and the negative electrode is manufactured.

(1) After the electrode and the separator are bonded to each other by dry heat press on the laminate, the laminate is housed in the exterior material (for example, a pack made of an aluminum laminate film. Same as below), the electrolytic solution is injected into the container member, the inside of the container member is brought into a vacuum state, and then the laminate is further wet heat pressed from above the container member, thereby performing the bonding of the electrode and the separator, and the sealing of the container member.

(2) The laminate is housed in the exterior material, the electrolytic solution is injected into the exterior material, the inside of the exterior material is brought into the vacuum state, and then the laminate is wet heat pressed from above the exterior material, thereby performing the bonding of the electrode and the separator and the sealing of the exterior material.

(3) After the electrode and the separator are bonded to each other by the dry heat press on the laminate, the laminate is housed in the exterior material, the electrolytic solution is injected into the exterior material, the inside of the exterior material is brought into the vacuum state, and then the exterior material is sealed.

As the conditions for the wet heat press in the above manufacturing methods, the press temperature is preferably from 70° C. to 110° C. and the press pressure is preferably from 0.5 MPa to 2 MPa. As the conditions for the dry heat press in the above manufacturing methods, the press temperature is preferably from 20° C. to 100° C. and the press pressure is preferably from 0.5 MPa to 9 MPa. The press time is preferably controlled in accordance with the press temperature and press pressure, and the press time is controlled, for example, in the range of from 0.5 minute to 60 minutes.

When the laminate in which the separator is disposed between the positive electrode and the negative electrode is manufactured, the method of disposing a separator between a positive electrode and a negative electrode may be a method of laminating at least one positive electrode, one separator, and one negative electrode in this order (so-called stack method), or may be a method of laminating a positive electrode, a separator, a negative electrode, and a separator in this order and winding the positive electrode, the separator, the negative electrode, and the separator in a length direction.

EXAMPLES

Hereinafter, the separator and the non-aqueous secondary battery of the disclosure will be described more specifically with reference to Examples. Materials, used amounts, ratios, treatment procedures, and the like illustrated in the following Examples can be changed, if appropriate without departing from the spirit of the disclosure. Therefore, the range of the separator and the non-aqueous secondary battery of the disclosure should not be construed as being limited by the specific examples described below.

In the following explanation, synthesis, treatment, production, and the like were performed at room temperature (25° C.±3° C.), unless otherwise noted.

<Measurement Method and Evaluation Method>

The measurement methods and evaluation methods applied in the examples of the invention and comparative examples are as follows.

[Quantitative Determination of Fluorine Atom of Porous Substrate]

As measuring apparatuses, a field emission scanning electron microscope S-4800 (Hitachi High-Technologies Corporation) and a QUANTAX Flat QUAD System Xflash 5060FQ (Bruker AXS) were used. An acceleration voltage at the time of SEM observation was set to 1.5 kV, and an acceleration voltage at the time of EDX analysis was set to 3.5 kV.

[Analysis of Structural Unit of Polyvinylidene Fluoride Type Resin]

A polyvinylidene fluoride type resin used for forming the adhesive porous layer was used as a sample. In 0.6 mL of heavy dimethyl sulfoxide, 20 mg of the polyvinylidene fluoride type resin was dissolved at 100° C., and an 19F-NMR spectrum was measured at 100° C. From the obtained NMR spectrum, a ratio (mol %) of a structural unit derived from HFP and a ratio (mol %) of a structural unit derived from the monomer represented by Formula (1) were determined.

[Weight-Average Molecular Weight (Mw) of Polyvinylidene Fluoride Type Resin]

Using a polyvinylidene fluoride type resin used for forming the adhesive porous layer as a sample, a molecular weight was measured by GPC. The molecular weight was measured by GPC using a GPC apparatus "GPC-900" manufactured by JASCO Corporation, using two columns of TSKgel SUPER AWM-H manufactured by Tosoh Corporation, using N,N-dimethylformamide for a solvent, under conditions that temperature was 40° C. and a flow rate was 0.6 mL/min to obtain a molecular weight in terms of polystyrene.

[Melting Point of Polyvinylidene Fluoride Type Resin]

A polyvinylidene fluoride type resin used for forming the adhesive porous layer was used as a sample, and differential scanning calorimetry was performed to determine a melting point. As a measuring apparatus, trade name: DSC Q20 (TA Instruments) was used.

[Acid Value of Polyvinylidene Fluoride Type Resin]

Using a polyvinylidene fluoride type resin used for forming the adhesive porous layer as a sample, an acid value (mgKOH/g) was measured by a potentiometric titration method (JIS K1557-5: 2007).

[Average Primary Particle Size of Inorganic Filler]

Using an inorganic filler used for forming the adhesive porous layer as a sample, SEM observation was performed to determine an average primary particle size.

[Volume Ratio of Inorganic Filler]

A ratio V (% by volume) of the inorganic filler to the solid content volume of the adhesive porous layer was determined by the following formula.

$$V=\{(Xa/Da)/(Xa/Da+Xb/Db+Xc/Dc+\ldots+Xn/Dn)\}\times 100$$

Here, among the constituent materials of the adhesive porous layer, the inorganic filler is represented by a, and the other constituent materials are represented by b, c, . . . , and n, respectively, the masses of the constituent materials contained in the adhesive porous layer having a predetermined area are represented by Xa, Xb, Xc, . . . , and Xn (g), respectively, and the true densities of the constituent materials are represented by Da, Db, Dc, . . . , and Dn ($g/cm^3$), respectively. Xa or the like substituted in the above formula is the mass (g) of a constituent material used for forming the adhesive porous layer having a predetermined area. Da or the like substituted in the above formula is the true density ($g/cm^3$) of a constituent material used for forming the adhesive porous layer.

[Differential Scanning Calorimetry of Polyvinylidene Fluoride Type Resin Contained in Adhesive Porous Layer]

In each of Examples and Comparative Examples, since adhesive porous layers were formed by applying equal amounts of the same coating liquid to both sides of a porous substrate, it was inferred that the adhesive porous layers on both sides had the same thermal characteristics.

One of the adhesive porous layers was peeled off from the separator, and the peeled adhesive porous layer was immersed in dimethylacetamide and heated to about 50° C. to obtain a resin solution in which a polyvinylidene fluoride type resin was dissolved. The resin solution was centrifuged in a centrifuge to precipitate an insoluble matter. The supernatant of the resin solution in which the insoluble matter had been precipitated was taken out, centrifugation was repeated, and the insoluble matter was removed. The resin solution from which the insoluble matter had been removed was added dropwise to water to solidify the polyvinylidene fluoride type resin. The solidified product was taken out from the water and dried, and the dried solid was used as a sample.

In an aluminum sample pan (part number 900786.901 manufactured by TA Instruments), 5 mg of the sample was put. The aluminum sample pan was covered with a lid (part number 900779.901 manufactured by TA Instruments), and set in a measuring apparatus. As a measuring apparatus, trade name: DSC Q20 (TA Instruments) was used. Thermal analysis was performed by changing the sample temperature in the above-described three steps while nitrogen gas was flowing at a flow rate of 50 ml/min.

[Dry Adhesion]

300 parts by mass of artificial graphite as a negative electrode active material, 7.5 parts by mass of a water-soluble dispersion containing 40% by mass of a modified styrene-butadiene copolymer as a binder resin, 3 parts by mass of carboxymethylcellulose as a thickener, and an appropriate amount of water were mixed under stirring with a double-armed mixer to prepare a negative electrode slurry. This negative electrode slurry was applied to one side of a copper foil having a thickness of 10 μm, dried, and then pressed to obtain a negative electrode having a negative electrode active material layer.

The negative electrode was cut into a rectangle of 15 mm×70 mm.

The separator was cut into a rectangle of TD 20 mm×MD 75 mm.

A rectangular release paper of 15 mm×70 mm was prepared.

A laminate in which the negative electrode, the separator, and the release paper were laminated in this order was inserted into a pack made of an aluminum laminate film, was hot-pressed together with the pack in a laminating direction of the laminate using a hot pressing machine (dry heat press), thereby bonding the negative electrode and the separator to each other. Conditions for the hot pressing were a temperature of 90° C., a load of 30 kg per $cm^2$ of the electrode, and a pressing time of 30 seconds. Thereafter, the laminate was taken out from the pack, the release paper was peeled off, and the resulting product was used as a test piece.

A non-coated side of the negative electrode of the test piece was fixed to a metal plate with a double-sided tape, and the metal plate was fixed to a lower chuck of a Tensilon (A & D Company, STB-1225S). At this time, the metal plat was fixed to the Tensilon such that a length direction of the test piece (that is, MD of the separator) was matched with the direction of gravity. The separator was peeled off from the negative electrode by about 2 cm from a lower end. The end was fixed to an upper chuck, and a 180° peel test was performed. A tensile speed in the 180° peel test was 300 mm/min. A load (N) from 10 mm to 40 mm after start of measurement was sampled at 0.4 mm intervals. An average thereof was calculated. Furthermore, the loads of ten test pieces were averaged.

[Wet Adhesion]

89.5 parts by mass of lithium cobaltate powder as a positive electrode active material, 4.5 parts by mass of acetylene black as a conductive auxiliary agent, 6 parts by mass of polyvinylidene fluoride as a binder resin, and an appropriate amount of N-methyl-2-pyrrolidone were mixed under stirring with a double-armed mixer to prepare a positive electrode slurry. This positive electrode slurry was applied to both sides of an aluminum foil having a thickness of 20 μm, dried, and then pressed to obtain a double-sided positive electrode having positive electrode active material layers on both sides.

300 parts by mass of artificial graphite as a negative electrode active material, 7.5 parts by mass of a water-soluble dispersion containing 40% by mass of a modified styrene-butadiene copolymer as a binder resin, 3 parts by mass of carboxymethylcellulose as a thickener, and an appropriate amount of water were mixed under stirring with a double-armed mixer to prepare a negative electrode slurry. The negative electrode slurry was applied to both sides of a copper foil having a thickness of 10 μm, dried, and then pressed to obtain a double-sided negative electrode having negative electrode active material layers on both sides.

The positive electrode and the negative electrode were each cut into a rectangle of 30 mm×70 mm.

The separator was cut into a rectangle of TD 35 mm x MD 75 mm.

These were laminated such that the positive electrode and the negative electrode were alternately laminated and the separator was sandwiched between the positive electrode and the negative electrode to prepare a laminate including three positive electrodes, three negative electrodes, and five separators. The laminate was inserted into a pack made of an aluminum laminate film, an electrolytic solution (1 mol/L $LiPF_6$-ethylene carbonate:ethyl methyl carbonate [mass ratio 3:7]) was injected into the pack, and the laminate was impregnated with the electrolytic solution. Subsequently, the laminate was hot-pressed together with the pack in a laminating direction of the laminate using a hot pressing machine (wet heat press), and the electrode and the separator were bonded to each other. Conditions for the hot pressing were a temperature of 90° C., a load of 10 kg per $cm^2$ of the electrode, and a pressing time of two minutes, and the resulting product was used as a wet adhesion measuring cell.

The cell was subjected to a compression bending test (three-point bending measurement). The measurement was performed by attaching a compression bending test jig to a Tensilon (A & D Company, STB-1225S). A distance between support bases was set to 4 cm. The cell was disposed on the support bases such that a short direction of the cell was parallel to a longitudinal direction of an indenter and a compression position at the time of measurement was the center of an intra-cell electrode in the longitudinal direction. A displacement when the indenter was lowered until a load of 0.1 N was applied was set to 0, and measurement was started. A compression speed at the time of measurement was set to 2 mm/min, and measurement was performed until a displacement reached 2 mm. A yield point load in a load displacement curve obtained from this result was defined as wet adhesive strength. When the yield point load could not be observed, a maximum load was defined as the wet adhesive strength.

[Film Resistance Value after Heat Treatment]

The separator was cut into a rectangle of 6 cm×4 cm, impregnated with 1 mol/L $LiBF_4$-propylene carbonate:ethylene carbonate (mass ratio 1:1) as an electrolytic solution, sandwiched between aluminum foil electrodes with lead tabs, and sealed in an aluminum pack. The resulting product was used as a test cell. The test cell was placed at a temperature of 100° C. for 30 minutes. Subsequently, a resistance value of the test cell was measured at a temperature of 20° C. by an AC impedance method (measuring frequency 100 kHz). An average value for the ten test cells was calculated and defined as a film resistance value ($\Omega\cdot cm^2$) after the heat treatment.

[Discharge Capacity Retention Ratio]

20 test batteries were prepared. Ten batteries among the 20 batteries were not heat-treated and used as standard batteries. The remaining ten batteries were allowed to stand at a temperature of 100° C. for 30 minutes, and used as heat-treated batteries.

The following charge and discharge were performed on the ten standard batteries and the ten heat-treated batteries. A cycle of charge and discharge in which charge was performed at a constant current and a constant voltage of 0.2 C and 4.2 V, and discharge was performed at a constant current of 0.2 C and a cutoff of 2.5 V was performed for five cycles. Subsequently, charge was performed at a constant current and a constant voltage of 0.2 C and 4.2 V, and discharge was performed at a constant current of 10 C and a cutoff of 2.5 V. A discharge capacity at this time was recorded. An average value of the discharge capacities of the ten standard batteries and an average value of the discharge capacities of the ten heat-treated batteries were calculated. A ratio of the discharge capacity of the heat-treated battery to the discharge capacity of the standard battery was defined as a discharge capacity retention ratio (%) of a battery exposed to a high temperature, and the discharge capacity retention ratio was determined from the following formula.

$$\text{Discharge capacity retention ratio} = \text{discharge capacity of heat-treated battery} / \text{discharge capacity of standard battery} \times 100$$

<Preparation of Separator and Battery>

Example 1

—Preparation of Separator—

As materials of an adhesive porous layer, two types of polyvinylidene fluoride type resins and magnesium hydroxide particles were prepared. Physical properties of these substances are as presented in Table 1.

The two types of polyvinylidene fluoride type resins were mixed at a mass ratio of 40:60, and dissolved in dimethylacetamide (DMAc) such that a resin concentration was 5.0% by mass. Furthermore, magnesium hydroxide particles were dispersed in the solution under stirring to obtain a coating liquid (1).

A polyethylene microporous film (thickness: 7 μm, porosity: 45%, Gurley value: 80 sec/100 mL) was immersed in DMAc, and pores of the polyethylene microporous film were impregnated with DMAc. Hereinafter, this step is referred to as “pretreatment of the porous substrate”.

An appropriate amount of the coating liquid (1) was placed on a Meyer bar, and the coating liquid (1) was applied to both surfaces of the pretreated polyethylene microporous film. At that time, coating was performed such that the coating amounts of the front and back surfaces of the polyethylene microporous film were equal. The resulting film was immersed in a coagulation liquid (DMAc:water=50:50 [mass ratio], liquid temperature: 40° C.) to solidify the coating layers, subsequently washed in a water washing tank at a water temperature of 40° C., and dried. In this way, a separator having adhesive porous layers formed on both surfaces of the polyethylene microporous film was obtained. The thickness of the adhesive porous layer was approximately 3 μm per surface.

—Preparation of Negative Electrode—

300 parts by mass of artificial graphite as a negative electrode active material, 7.5 parts by mass of a water-soluble dispersion containing 40% by mass of a modified styrene-butadiene copolymer as a binder resin, 3 parts by mass of carboxymethylcellulose as a thickener, and an appropriate amount of water were mixed under stirring with a double-armed mixer to prepare a negative electrode slurry. The negative electrode slurry was applied to one side of a copper foil having a thickness of 10 μm, dried, and then pressed to obtain a negative electrode having a negative electrode active material layer.

—Preparation of Positive Electrode—

89.5 parts by mass of lithium cobaltate powder as a positive electrode active material, 4.5 parts by mass of acetylene black as a conductive auxiliary agent, 6 parts by mass of polyvinylidene fluoride as a binder resin, and an appropriate amount of N-methyl-2-pyrrolidone were mixed under stirring with a double-armed mixer to prepare a positive electrode slurry. This positive electrode slurry was applied to one side of an aluminum foil having a thickness of 20 μm, dried, and then pressed to obtain a positive electrode having a positive electrode active material layer.

—Preparation of Battery—

The positive electrode was cut into a rectangle of 3 cm×5 cm, the negative electrode was cut into a rectangle of 3.2 cm×5.2 cm, and a lead tab was welded to each of the rectangles. The separator was cut into a rectangle of 3.4 cm×5.4 cm.

The positive electrode, the separator, and the negative electrode were laminated in this order. The laminate was hot-pressed in a laminating direction of the laminate using a hot pressing machine (dry heat press), and the electrode and the separator were temporarily bonded to each other. Conditions for the hot pressing were a temperature of 90° C., a load of 30 kg per $cm^2$ of the electrode, and a pressing time of 30 seconds.

The temporarily bonded laminate was inserted into a pack made of an aluminum laminate film, an electrolytic solution (1 mol/L $LiPF_6$-ethylene carbonate:ethyl methyl carbonate [mass ratio 3:7]) was injected into the pack, and the laminate was impregnated with the electrolytic solution. Subsequently, the laminate was hot-pressed together with the pack in a laminating direction of the laminate using a hot pressing machine (wet heat press), and the electrode and the separator were bonded to each other. Conditions for the hot pressing were a temperature of 90° C., a load of 10 kg per $cm^2$ of the electrode, and a pressing time of two minutes.

Subsequently, the pack was sealed while the inside of the pack was vacuum using a vacuum sealer to obtain a test battery.

Examples 2 to 4 and Comparative Examples 1 to 4

Separators were prepared in a similar manner to Example 1 except that the presence or absence of pretreatment of the porous substrate as well as the types and amounts of the polyvinylidene fluoride type resin and the filler, which are materials of the adhesive porous layer, were changed to those presented in Table 1. The thickness of the adhesive porous layer was approximately 3 μm per side.

Then, a test battery was prepared in a similar manner to Example 1 using each of the separators.

"PVDF type resin X" in Table 1 is a resin corresponding to the polyvinylidene fluoride type resin X or a comparative polyvinylidene fluoride type resin thereof. The PVDF type resin X is a binary copolymer containing VDF and HFP.

"PVDF type resin Y" in Table 1 is a resin corresponding to the polyvinylidene fluoride type resin Y or a comparative polyvinylidene fluoride type resin thereof. The PVDF type resin Y is a ternary copolymer containing VDF, HFP, and the monomer represented by Formula (1). The monomer represented by Formula (1) in the PVDF type resin Y is acrylic acid in all examples.

Tables 1 and 2 present the compositions, physical properties, and evaluation results of the separators in Examples 1 to 4 and Comparative Examples 1 to 4.

TABLE 1

| | Porous substrate | | Constituent material of adhesive porous layer: PVDF type resin X | | | PVDF type resin Y | | | |
|---|---|---|---|---|---|---|---|---|---|
| | Pretreatment — | Fluorine atom atomic % | HFP mol % | Mw $\times10^4$ | Melting point ° C. | HFP mol % | Monomer represented by formula (1) mol % | Mw $\times10^4$ | Melting point ° C. |
| Example 1 | Pretreated | 0.07 | 7.0 | 34 | 133 | 1.1 | 0.1 | 193 | 163 |
| Example 2 | Pretreated | 0.32 | 7.0 | 34 | 133 | 1.1 | 0.1 | 193 | 163 |
| Example 3 | Pretreated | 0.09 | 5.7 | 86 | 135 | 1.1 | 0.1 | 193 | 163 |
| Example 4 | Pretreated | 0.15 | 7.0 | 34 | 133 | 0.8 | 0.7 | 170 | 159 |
| Comparative Example 1 | Pretreated | 0.07 | 7.0 | 34 | 133 | 2.5 | 0.1 | 20 | 155 |
| Comparative Example 2 | Pretreated | 0.07 | 2.4 | 113 | 147 | 1.1 | 0.1 | 193 | 163 |
| Comparative Example 3 | Not pretreated | 0 | 7.0 | 34 | 133 | 1.1 | 0.1 | 193 | 163 |
| Comparative Example 4 | Not pretreated | 0 | 7.0 | 34 | 133 | 1.1 | 0.1 | 193 | 163 |

TABLE 1-continued

| | Constituent material of adhesive porous layer | | | | | | | | |
|---|---|---|---|---|---|---|---|---|---|
| | X and Y | | All of resin | | | | Filler | | |
| | Difference in melting point ° C. | Mass ratio — | HFP mol % | Monomer represented by formula (1) mol % | Acid value mgKOH/g | Mw $\times 10^4$ | Type — | Average primary particle size μm | Ration to solid content volume % by volume |
| Example 1 | 30 | 40:60 | 6.4 | 0.01 | 1.3 | 98 | $BaSO_4$ | 0.1 | 50 |
| Example 2 | 30 | 50:50 | 6.1 | 0.01 | 1.6 | 114 | Alumina | 0.5 | 69 |
| Example 3 | 28 | 40:60 | 4.6 | 0.02 | 2.4 | 129 | $BaSO_4$ | 0.1 | 50 |
| Example 4 | 26 | 40:60 | 6.3 | 0.08 | 2.5 | 88 | $BaSO_4$ | 0.1 | 50 |
| Comparative Example 1 | 22 | 40:60 | 4.6 | 0.05 | 1.0 | 28 | $BaSO_4$ | 0.1 | 50 |
| Comparative Example 2 | 16 | 40:60 | 1.8 | 0.08 | 2.1 | 161 | $BaSO_4$ | 0.1 | 50 |
| Comparative Example 3 | 30 | 40:60 | 5.8 | 0.02 | 1.9 | 129 | $BaSO_4$ | 0.1 | 50 |
| Comparative Example 4 | 30 | 50:50 | 6.1 | 0.01 | 1.6 | 114 | Alumina | 0.5 | 69 |

TABLE 2

| | PVDF type resin of adhesive porous layer | | | | | | Performance of separator | | | |
|---|---|---|---|---|---|---|---|---|---|---|
| | First endothermic peak Temperature ° C. | Second endothermic peak Temperature ° C. | Temperature difference between endothermic peaks Temperature ° C. | First exothermic peak Temperature ° C. | Second exothermic peak Temperature ° C. | Temperature difference between exothermic peaks Temperature ° C. | Dry adhesion N | Wet adhesion N | Film resistance value after heat treatment $\Omega \cdot cm^2$ | Discharge capacity retention ratio % |
| Example 1 | 132 | 162 | 30 | 108 | 140 | 32 | 0.09 | 7 | 4.2 | 95 |
| Example 2 | 132 | 162 | 30 | 108 | 140 | 32 | 0.10 | 5 | 2.8 | 89 |
| Example 3 | 133 | 163 | 30 | 110 | 141 | 31 | 0.08 | 8 | 3.7 | 92 |
| Example 4 | 132 | 163 | 31 | 107 | 140 | 33 | 0.11 | 10 | 3.0 | 88 |
| Comparative Example 1 | 132 | None | — | 108 | None | — | 0.20 | 12 | 2.7 | 65 |
| Comparative Example 2 | None | 158 | — | None | 128 | — | 0.02 | 7 | 4.6 | 92 |
| Comparative Example 3 | 132 | 162 | 30 | 108 | 140 | 32 | 0.06 | 10 | 14.2 | 88 |
| Comparative Example 4 | 134 | 161 | 27 | 112 | 135 | 23 | 0.05 | 5 | 12.9 | 86 |

Reference Example 1

The two types of polyvinylidene fluoride type resins used in Examples 1 to 4 were mixed at a mass ratio of 50:50. DSC was performed using this mixed resin as a sample, and thermal characteristics were analyzed. Analysis results thereof are presented in Table 3.

Reference Example 2

The two types of polyvinylidene fluoride type resins used in Example 3 were mixed at a mass ratio of 50:50. DSC was performed using this mixed resin as a sample, and thermal characteristics were analyzed. Analysis results thereof are presented in Table 3.

TABLE 3

| | Polyvinylidene fluoride type resin | | | | | | | | |
|---|---|---|---|---|---|---|---|---|---|
| | PVDF type resin X | | | PVDF type resin Y | | | | X and Y | |
| | HFP mol % | Mw ×10^4 | Melting point ° C. | HFP mol % | Monomer represented by formula (1) mol % | Mw ×10^4 | Melting point ° C. | Difference in melting point ° C. | Mass ratio — |
| Reference Example 1 | 7.0 | 34 | 133 | 1.1 | 0.1 | 193 | 163 | 30 | 50:50 |
| Reference Example 2 | 5.7 | 86 | 135 | 1.1 | 0.1 | 193 | 163 | 28 | 50:50 |

| | Mixed resin | | | | | |
|---|---|---|---|---|---|---|
| | First endothermic peak Temperature ° C. | Second endothermic peak Temperature ° C. | Temperature difference between endothermic peaks Temperature ° C. | First exothermic peak Temperature ° C. | Second exothermic peak Temperature ° C. | Temperature difference between exothermic peaks Temperature ° C. |
| Reference Example 1 | 133 | 164 | 31 | 96 | 141 | 45 |
| Reference Example 2 | 135 | 164 | 29 | 102 | 142 | 40 |

In Reference Example 1 and Reference Example 2, the mixing ratios between the two types of polyvinylidene fluoride type resins are the same. However, out of the two types of polyvinylidene fluoride type resins, as a polyvinylidene fluoride type resin having a low melting point (corresponding to the polyvinylidene fluoride type resin X), different types of resins were used, and as a polyvinylidene fluoride type resin having a high melting point (corresponding to the polyvinylidene fluoride type resin Y), the same type of resin was used.

Comparison between Reference Example 1 and Reference Example 2 indicates that an endothermic peak temperature and an exothermic peak temperature on a low temperature side vary by changing the type of the polyvinylidene fluoride type resin having a low melting point.

In Reference Example 1 and Example 2, the same two types of polyvinylidene fluoride type resins were used, and the same mixing ratio thereof was used. Note that the sample subjected to DSC in Example 2 is a polyvinylidene fluoride type resin extracted from the adhesive porous layer, and therefore the sample is a polyvinylidene fluoride type resin that has been subjected to a process of forming an adhesive porous layer.

Comparison between Reference Example 1 and Example 2 indicates that the mixture of the two types of polyvinylidene fluoride type resins is subjected to a process of forming an adhesive porous layer, thereby reducing a temperature difference between endothermic peaks and a temperature difference between exothermic peaks. That is, through the process of forming an adhesive porous layer, an endothermic peak and an exothermic peak on a low temperature side are shifted to a high temperature side, and an endothermic peak and an exothermic peak on a high temperature side are shifted to a low temperature side.

From this, it is presumed that in the process of forming an adhesive porous layer, the two types of polyvinylidene fluoride type resins are partially compatible with each other, and there are a region in which a polyvinylidene fluoride type resin having a high melting point is slightly dissolved in a polyvinylidene fluoride type resin having a low melting point, and a region in which the polyvinylidene fluoride type resin having a low melting point is slightly dissolved in the polyvinylidene fluoride type resin having a high melting point. As a result, it is presumed that the endothermic peak and the exothermic peak on the low temperature side are shifted to the high temperature side, and the endothermic peak and the exothermic peak on the high temperature side are shifted to the low temperature side.

In Comparative Example 1, the difference between the melting points of the two types of polyvinylidene fluoride type resins was 22° C., and in a DSC curve of the polyvinylidene fluoride type resin extracted from the adhesive porous layer, one endothermic peak and one exothermic peak were observed instead of two endothermic peaks and two exothermic peaks.

As described above, it is presumed that the two types of polyvinylidene fluoride type resins are at least partially compatible in the process of forming an adhesive porous layer. At this time, when the characteristics (characterized by a ratio of HFP, a molecular weight, and a melting point) of the two types of polyvinylidene fluoride type resins are close to each other, it is presumed that the two types of polyvinylidene fluoride type resins are completely compatible with each other, and there are one endothermic peak and one exothermic peak observed in the DSC curve.

The disclosure of Japanese Patent Application No. 2021-118147 filed on Jul. 16, 2021 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:

a porous substrate; and an adhesive porous layer that is provided on one side or on both sides of the porous substrate, and that contains a polyvinylidene fluoride type resin and a filler, wherein the porous substrate contains a fluorine atom, and wherein, when differential scanning calorimetry is performed with all of the polyvinylidene fluoride type resin contained in the adhesive porous layer as a sample, two or more endothermic peaks and/or two or more exothermic peaks are observed.

2. The separator for a non-aqueous secondary battery according to claim 1, wherein, when differential scanning calorimetry is performed with all of the polyvinylidene fluoride type resin contained in the adhesive porous layer as a sample, at least one endothermic peak is observed in a region of 125° C. or more and less than 140° C. and at least one endothermic peak is observed in a region of 140° C. or more and less than 190° C.

3. The separator for a non-aqueous secondary battery according to claim 1, wherein, when differential scanning calorimetry is performed with all of the polyvinylidene fluoride type resin contained in the adhesive porous layer as a sample, two or more endothermic peaks are observed, and a temperature difference between adjacent endothermic peaks is 10° C. or more and 60° C. or less.

4. The separator for a non-aqueous secondary battery according to claim 1, wherein, when differential scanning calorimetry is performed with all of the polyvinylidene fluoride type resin contained in the adhesive porous layer as a sample, at least one exothermic peak is observed in a region of 80° C. or more and less than 125° C., and at least one exothermic peak is observed in a region of 125° C. or more and less than 190° C.

5. The separator for a non-aqueous secondary battery according to claim 1, wherein, when differential scanning calorimetry is performed with all of the polyvinylidene fluoride type resin contained in the adhesive porous layer as a sample, two or more exothermic peaks are observed, and a temperature difference between adjacent exothermic peaks is 10° C. or more and 90° C. or less.

6. A separator for a non-aqueous secondary battery, the separator comprising:

a porous substrate; and an adhesive porous layer that is provided on one side or on both sides of the porous substrate, and that contains a polyvinylidene fluoride type resin and a filler, wherein the porous substrate contains a fluorine atom, and wherein the polyvinylidene fluoride type resin contains the following polyvinylidene fluoride type resin X and the following polyvinylidene fluoride type resin Y:

polyvinylidene fluoride type resin X: containing structural units derived from vinylidene fluoride and structural units derived from hexafluoropropylene, a content ratio of structural units derived from hexafluoropropylene being from more than 3.5 mol % to 15 mol % with respect to a total of structural units, a weight-average molecular weight being from 100,000 to less than 1,000,000, and a melting point being from 125° C. to less than 150° C., and polyvinylidene fluoride type resin Y: containing structural units derived from vinylidene fluoride and optionally containing structural units derived from hexafluoropropylene, a content ratio of structural units derived from hexafluoropropylene being from 0 mol % to 3.5 mol % with respect to a total of structural units, a weight-average molecular weight being from 1,000,000 to less than 3,000,000, and a melting point being from 150° C. to less than 180° C.

7. The separator for a non-aqueous secondary battery according to claim 6, wherein, when differential scanning calorimetry is performed with all of the polyvinylidene fluoride type resin contained in the adhesive porous layer as a sample, two or more endothermic peaks and/or two or more exothermic peaks are observed.

8. The separator for a non-aqueous secondary battery according to claim 6, wherein a difference between a melting point of the polyvinylidene fluoride type resin X and a melting point of the polyvinylidene fluoride type resin Y is from 25° C. to less than 55° C.

9. The separator for a non-aqueous secondary battery according to claim 6, wherein a mass ratio of the polyvinylidene fluoride resin X and the polyvinylidene fluoride resin Y in the adhesive porous layer is from 20:80 to 80:20.

10. The separator for a non-aqueous secondary battery according to claim 6, wherein the polyvinylidene fluoride type resin X contains structural units derived from vinylidene fluoride and structural units derived from hexafluoropropylene, a content ratio of structural units derived from hexafluoropropylene is from more than 5.0 mol % to 15 mol % with respect to a total of structural units, the weight-average molecular weight of the polyvinylidene fluoride type resin X is from 300,000 to less than 1,000,000, and the melting point of the polyvinylidene fluoride type resin X is from 125° C. to less than 140° C.

11. The separator for a non-aqueous secondary battery according to claim 6, wherein the polyvinylidene fluoride type resin Y contains structural units derived from vinylidene fluoride and optionally contains structural units derived from hexafluoropropylene, a content ratio of structural units derived from hexafluoropropylene is from 0 mol % to 2.0 mol % with respect to a total of structural units, the weight-average molecular weight of the polyvinylidene fluoride type resin Y is from 1,500,000 to less than 2,000,000, and the melting point of the polyvinylidene fluoride type resin Y is from 150° C. to less than 170° C.

12. The separator for a non-aqueous secondary battery according to claim 1, wherein a content ratio of fluorine atom in the porous substrate is from 0.05 atomic % to 1.00 atomic %.

13. The separator for a non-aqueous secondary battery according to claim 1, wherein the adhesive porous layer comprises structural units derived from a monomer represented by the following formula (1):

Formula (1)

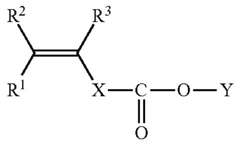

wherein, in Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or —R—O—C(═O)—$(CH_2)_n$—C(═O)—OH, wherein R represents a $C_{1-5}$ alkylene group, and n represents an integer of 0 or more.

14. The separator for a non-aqueous secondary battery according to claim 1, wherein an acid value of all of the polyvinylidene fluoride type resin contained in the adhesive porous layer is less than 3.0 mg KOH/g.

15. The separator for a non-aqueous secondary battery according to claim 1, wherein a weight-average molecular weight of all of the polyvinylidene fluoride type resin contained in the adhesive porous layer is from 300,000 to less than 3,000,000.

16. The separator for a non-aqueous secondary battery according to claim 1, wherein a content ratio of structural units derived from hexafluoropropylene is from more than 3.5 mol % to 7.0 mol % with respect to a total of structural units, in all of the polyvinylidene fluoride type resin contained in the adhesive porous layer.

17. The separator for a non-aqueous secondary battery according to claim 1, wherein a volume ratio of the filler in the adhesive porous layer excluding pores is from 30% by volume to 90% by volume.

18. The separator for a non-aqueous secondary battery according to claim 1, wherein the filler contains at least one selected from the group consisting of metal hydroxide particles, metal sulfate particles, and barium titanate particles.

19. The separator for a non-aqueous secondary battery according to claim 1, wherein an average primary particle size of all of the filler contained in the adhesive porous layer is from 0.01 μm to 1.5 μm.

20. A non-aqueous secondary battery that obtains electromotive force by lithium doping and dedoping, the non-aqueous secondary battery comprising:

a positive electrode;

a negative electrode; and the separator for a non-aqueous secondary battery according to claim 1, the separator being disposed between the positive electrode and the negative electrode.

* * * * *